United States Patent
Ma et al.

(10) Patent No.: US 9,350,519 B2
(45) Date of Patent: May 24, 2016

(54) SYSTEMS AND METHODS FOR DYNAMIC WHITESPACE SPECTRUM MANAGEMENT

(75) Inventors: Liangping Ma, King of Prussia, PA (US); Chunxuan Ye, Wayne, PA (US); Saad Ahmad, Montreal (CA); Alpaslan Demir, East Meadow, NY (US); Rocco Di Girolamo, Laval (CA); Jean-Louis Gauvreau, La Prairie (CA); Alexander Reznik, Titusville, NJ (US); Angelo A. Cuffaro, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 544 days.

(21) Appl. No.: 13/102,559

(22) Filed: May 6, 2011

(65) Prior Publication Data

US 2011/0287802 A1 Nov. 24, 2011

Related U.S. Application Data

(60) Provisional application No. 61/332,004, filed on May 6, 2010, provisional application No. 61/362,581, filed on Jul. 8, 2010.

(51) Int. Cl.
*H04L 5/00* (2006.01)
*H04W 28/06* (2009.01)
(Continued)

(52) U.S. Cl.
CPC ........... *H04L 5/0066* (2013.01); *H04W 28/065* (2013.01); *H04W 72/042* (2013.01); *H04W 72/0413* (2013.01); *H04W 88/08* (2013.01)

(58) Field of Classification Search
CPC ..... H04W 16/14; H04W 24/00; H04W 28/26; H04W 72/04; H04W 72/0453; H04W 60/00; H04W 72/00; H04W 72/10; H04W 72/06; H04W 72/1226; H04W 88/08; G06F 17/30442; H04H 20/42; H04L 27/0006; H04J 1/16

USPC ................ 455/454, 509, 67.11, 67.13, 226.1, 455/232.1–234.1, 452.2, 114.2, 423, 522, 455/450; 370/328, 329, 252, 338, 462, 311
See application file for complete search history.

(56) References Cited

U.S. PATENT DOCUMENTS

RE43,066 E       1/2012  McHenry
8,155,649 B2 *   4/2012  McHenry et al. ............. 455/434
(Continued)

FOREIGN PATENT DOCUMENTS

JP    2007088941    *  9/2005
JP    2007-088941      4/2007
(Continued)

OTHER PUBLICATIONS

"International Search Report and Written Opinion", dated Nov. 14, 2011, International Application No. PCT/US2011/035554, 18 pages.
(Continued)

*Primary Examiner* — Sujatha Sharma
(74) *Attorney, Agent, or Firm* — Theodore Naccarella

(57) ABSTRACT

Systems and methods for dynamic white space management are described. First, local handling of channel queries, in which a channel query by a white space device (WSD) is handled by a local dynamic spectrum management (DSM) server, if the DSM server has all the information necessary for providing a response to the channel query. Second, a search extension, in which a WSDB passes part of a search for available channels to a local DSM server. Third, assisting of an available channel calculation, in which a DSM server provides spectrum sensing information to WSDBs to improve the available channel calculation within the WSDBs. And fourth, dynamic bandwidth management to meet the coexistence requirements. In addition, the content of the messages and procedures that enable the above value-adding functions and interactions with the WSDB systems are described.

30 Claims, 28 Drawing Sheets

(51) Int. Cl.
*H04W 72/04* (2009.01)
*H04W 88/08* (2009.01)

(56) References Cited

U.S. PATENT DOCUMENTS

| | | | |
|---|---|---|---|
| 8,290,503 B2* | 10/2012 | Sadek et al. | 455/452.1 |
| 8,762,125 B2* | 6/2014 | Errickson et al. | 703/23 |
| 2007/0253394 A1 | 11/2007 | Horiguchi et al. | |
| 2008/0222019 A1 | 9/2008 | Stanforth et al. | |
| 2008/0233946 A1 | 9/2008 | Henry | |
| 2008/0240024 A1 | 10/2008 | Rao et al. | |
| 2008/0268892 A1 | 10/2008 | Hamdi et al. | |
| 2010/0029263 A1 | 2/2010 | Senoo et al. | |
| 2011/0077042 A1* | 3/2011 | Stanforth et al. | 455/512 |
| 2011/0087639 A1* | 4/2011 | Gurney | G06F 17/30442 707/690 |
| 2011/0143761 A1* | 6/2011 | Uusitalo et al. | 455/450 |
| 2011/0228666 A1* | 9/2011 | Barbieri et al. | 370/216 |
| 2012/0052827 A1* | 3/2012 | Sadek et al. | 455/226.1 |
| 2012/0163309 A1* | 6/2012 | Ma et al. | 370/329 |
| 2013/0012138 A1* | 1/2013 | Zhang et al. | 455/67.13 |
| 2013/0150071 A1* | 6/2013 | Hassan et al. | 455/454 |
| 2013/0336241 A1* | 12/2013 | Keon | 370/329 |

FOREIGN PATENT DOCUMENTS

| | | |
|---|---|---|
| JP | 2007-166488 | 6/2007 |
| JP | 2007-300419 | 11/2007 |
| JP | 2010-41101 | 2/2010 |
| JP | 2012-502546 | 1/2012 |
| WO | WO-2010/027308 | 3/2010 |
| WO | WO-2012048090 | 4/2012 |

OTHER PUBLICATIONS

Motorola, "TV White Space Position Paper", Nov. 2008, 10 pages.
"Chinese Office Action", Chines Application No. 201180022815.4, Dec. 2, 2014, 12 pages.
"Chinese Office Action (English Translation)", Chinese Application No. 201180022815.4, Dec. 2, 2014.
"Japanese Official Notice of Rejection", Japanese Application No. 2013-509297, Mar. 31, 2015, 4 pages.
"Office of Engineering and Technology Invites Proposals from Entities Seeking to be Designated TV Band Device Database Managers", Federal Communications Commission, Public Notice, DA 09-2479, Nov. 25, 2009, 4 pages.
"Official Notice of Rejection (English Translation)", Japanese Application No. 2013-509297, Mar. 31, 2015, 5 Pages.
"Report and Order and Memorandum Opinion and Order", FCC 05-56; Mar. 16. 2010, 69 pages.
"Second Report and Order and Memorandum Opinion and Order", Federal Communications Commission, FCC 08-260, Nov. 14, 2008, 130 pages.
Comsearch, "Comsearch proposal to be designated as a TV band device database manager", Federal Communications Commission, FCC DA 09-2479. Jan. 4, 2010, 55 pages.
Google Inc, "Proposal by Google Inc. to provide a TV band device database management solution", Federal Communications Commission, DA 09-2479, Jan. 4, 2010, 20 pages.
IEEE, "Wireless Coexistence System Design Document", IEEE 802.19-10/0055r3 IEEE P802.19, Mar. 2010, 15 pages.
IEEE Computer Society, "Part 11: Wireless LAN Medium Access Control (MAC) and Physical Layer (PHY) Specifications, Amendment 3: 3650-3700 MHz Operation in USA", IEEE Std 802.11y, 2008, 90 pages.
Katsuya, Noujin, et al., "Radio Communication System, Radio Channel Monitoring Apparatus, and Radio Communication Method", JP2007-166488 English Abstract, Jun. 28, 2005, 1 page.
Neustar, "Proposal for Designated TV Band device database manager", In response to—Federal Communications Commission Office of Engineering and Technology Public Notice dated Nov. 25, 2009, Jan. 4, 2010, 55 pages.
Sakata, Ren, "Frequency Utilization Status Measuring System", JP2007-088941 English Abstract, Apr. 5, 2007, 1 page.
Spectrum Bridge Inc., "Spectrum Bridge response to PN DA-09-2479: Proposals for Designated TV Band Database Manager", Federal Communications Commission, Jan. 4, 2010, 39 pages.
Telcordia Technologies, Inc., "Comments of Telcordia Technologies: Proposal seeking to be designated as a TV band device database manager", Federal Communications Commission, Jan. 4, 2010, 25 pages.
"Japanese Notice of Rejection", Japanese Application No. 2013-509297, Feb. 9, 2016, 6 pages.
"Japanese Notice of Rejection (English Translation)", Japanese Application No. 2013-509297, Feb. 9, 2016, 7 pages.
Sallent, O., et al., "Cognitive Pilot Channel Enabling Spectrum Awareness", Communications Workshops, ICC Workshops, IEEE International Conference on IEEE, 2009, 6 pages.

* cited by examiner

SYSTEMS AND METHODS FOR DYNAMIC WHITESPACE SPECTRUM MANAGEMENT

CROSS REFERENCE TO RELATED APPLICATIONS

This application claims the benefit of U.S. Provisional Application No. 61/332,004, filed May 6, 2010 and U.S. Provisional Application No. 61/362,581, filed Jul. 8, 2010, both of which are incorporated by reference as if fully set forth.

FIELD OF INVENTION

This application is related to wireless communications.

BACKGROUND

In the United States, 408 MHz of spectrum from 54 MHz to 806 MHz is allocated for television (TV). Currently, 108 MHz of that spectrum is being redeveloped for commercial operations through auctions and for public safety applications. The remaining 300 MHz of this radio spectrum will, remain dedicated for over-the-air TV operations. Portions of that 300 MHz resource remain unused. The amount and exact frequency of unused spectrum varies from location to location. These unused portions of spectrum are referred to as TV white space (TVWS). The Federal Communications Commission (FCC) is opening these unused TVWS frequencies for a variety of unlicensed uses. Because there are fewer TV stations located outside top metropolitan areas, most of the unoccupied TVWS spectrum is available in low population density or rural areas that tend to be underserved with other broadband options, such as digital subscriber line (DSL) or cable.

The Federal Communications Commission has established rules that allow wireless transmit/receive units (WTRU s) (i.e., hereinafter referred to as white space devices (WSDs)) that are unlicensed to operate in broadcast television spectrum at locations where that spectrum is not used. In order to prevent interference to licensed WSDs operating in the TV bands, the FCC requires TV band WSD databases, also referred to as FCC TV white space databases (FCC-WSDBs), to be created to inform the WSDs of vacant TV channels, register the locations of fixed WSDs, as well as protect locations and channels of incumbent WSDs that are not recorded in the FCC databases.

Several proposals have been made to the FCC for mechanisms and message flows for use in WSDBs to implement three basic functions: a data repository, a data registration process and a query process. However, the WSDBs alone may not achieve good performance.

SUMMARY

In one embodiment, a method comprises receiving whitespace spectrum data from a whitespace data repository server. In one embodiment, the whitespace spectrum data includes available frequency range data. The method also comprises storing supplemental spectrum usage data and receiving a channel query message. The method also comprises transmitting a channel reply message including at least one preferred frequency range data. The at least one preferred frequency range data determined in part based on the whitespace spectrum data and the supplemental spectrum usage data.

In one embodiment a dynamic spectrum management (DSM) apparatus comprises a whitespace database management module configured to store whitespace spectrum data from a whitespace data repository server. In one embodiment, the whitespace spectrum data includes available frequency range data. The DSM apparatus also comprises a supplemental data storage module configured to store supplemental spectrum usage data and an interdependency module configured to identify relevant supplemental data based at least in part on whitespace device location information. The DSM apparatus also comprises a channel list generation module configured to identify at least one preferred frequency range data. In one embodiment, the at least one preferred frequency range data is determined in part based on the whitespace spectrum data and the supplemental spectrum usage data. The DSM apparatus also comprises a communication module adapted to communicate with a peer DSM, a whitespace device, and a whitespace data repository server.

In one embodiment, a computer readable storage medium having instructions stored thereon, that when executed by a processing apparatus, cause the apparatus to store whitespace spectrum data. In one embodiment, the whitespace spectrum data including available frequency range data. The computer readable storage medium has additional instructions that when executed by the processor store supplemental spectrum usage data, process a channel query message, and, generate a channel reply message including at least one preferred frequency range data. In one embodiment, the at least one preferred frequency range data determined in part based on the whitespace spectrum data and the supplemental spectrum usage data.

In one embodiment, a method comprises identifying fragmented spectrum utilization, analyzing access point interdependency information, and configuring a contiguous block of available spectrum by transmitting a channel reconfiguration message to a whitespace access point device.

In one embodiment, a method comprises obtaining spectrum usage data from a peer DSM device for WSD-APs managed by the peer DSM device. The method also comprises transmitting spectrum usage data to the peer DSM device for locally-managed WSD-APs and transmitting a channel reconfiguration message to the peer DSM device to alter the spectrum used by at least one WSD-AP managed by the peer DSM device.

BRIEF DESCRIPTION OF THE DRAWINGS

A more detailed understanding may be had from the following description, given by way of example in conjunction with the accompanying drawings wherein.

DETAILED DESCRIPTION

The presently disclosed systems and methods generally enhance television (TV) white space database (WSDB) solutions. In one aspect, local handling of channel queries, in which a channel query by a white space device (WSD) is handled by a local dynamic spectrum management (DSM) server, if the DSM server has all the information necessary for providing a response to the channel query is disclosed. In another aspect, a search extension, in which a WSDB passes part of a search for available channels to a local DSM server is disclosed. In yet another aspect, assisting of an available channel calculation, in which a DSM server provides spectrum sensing information to WSDBs to improve the available channel calculation within the WSDBs is disclosed. In yet another aspect, dynamic bandwidth management is disclosed which may assist with coexistence requirements. In addition, the content of example messages and procedures that enable the above value-adding functions and interactions with the WSDB systems are described.

While embodiments described herein are largely discussed in the context of television white space, this disclosure is not so limited. Instead, the description of television white space is merely one example application used for the sake of convenience. As is to be appreciated, the systems and methods described herein are applicable to a wide variety of frequencies ranges and applications.

Figure 1:
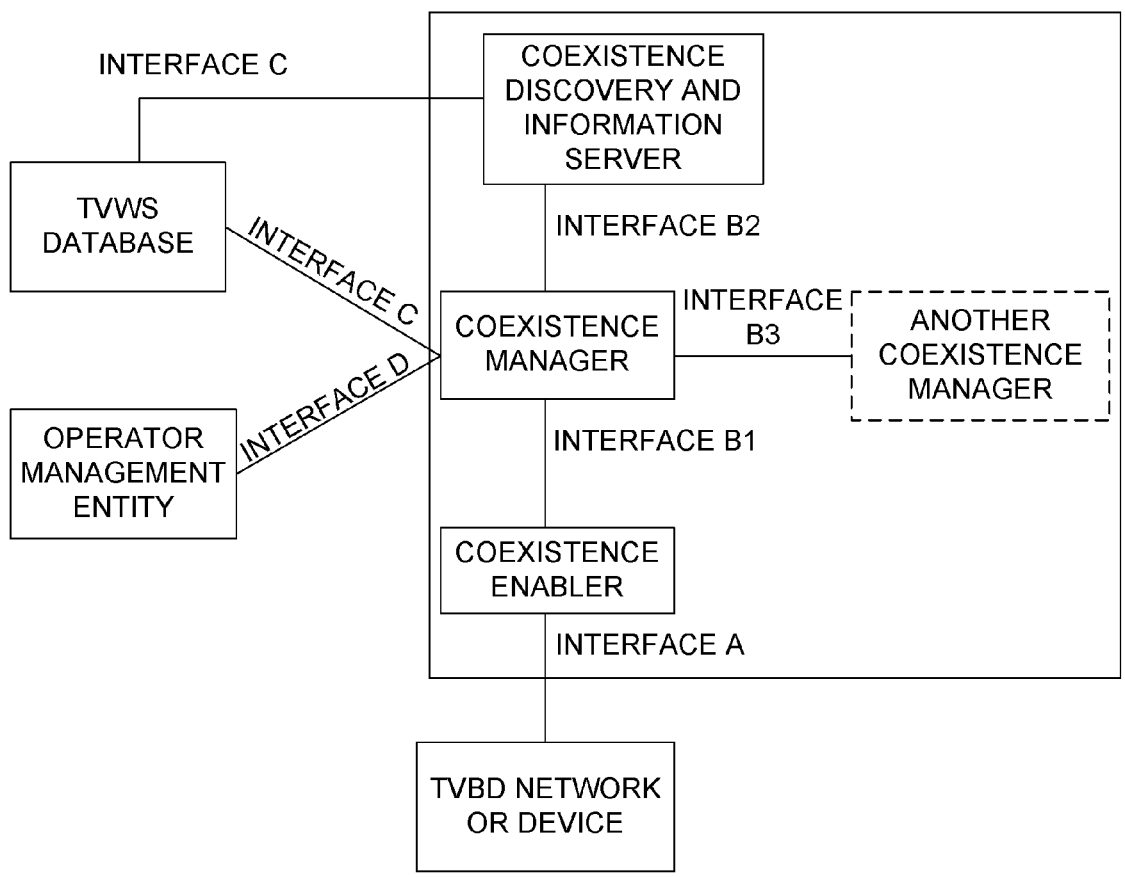
FIG. 1 shows a conventional IEEE system architecture.

The Institute of Electrical and Electronic Engineers (IEEE) standard defines radio technology independent methods for coexistence among dissimilar or independently operated WSD networks and WSDs. As part of this standard, IEEE 802.19.1 has defined a basic system architecture and interface definition, as shown in FIG. 1. The 802.19.1 system architecture is split into three (3) major logical entities: a coexistence enabler (CE), a coexistence manager (CM), and a coexistence discovery and information server (CDIS). The CM is the entity responsible for making coexistence decisions. It also supports inter-CM communication. The CE is responsible for making requests 'to' and Obtaining information 'from' TVBD networks or devices.

In one embodiment, the presently disclosed systems and methods for dynamic spectrum management (DSM) may be used with system architectures similar to those outlined in IEEE 802.19.1 to allow for improved spectrum management for various communication systems. The DSM system architectures described herein allow the formation of cluster structures, in which the head of the cluster (i.e., a DSM server) may serve as a proxy of a WSDB, thereby enabling local handling of channel queries and hence improving the efficiency of the current WSDB systems. As described below, other value adding functions may be offered by the DSM architectures as well. While the DSM systems and methods are not limited to any particular type of technology or architecture, in some embodiments the DSM systems and methods described herein may be a type of distributed shared memory.

Figure 2A:
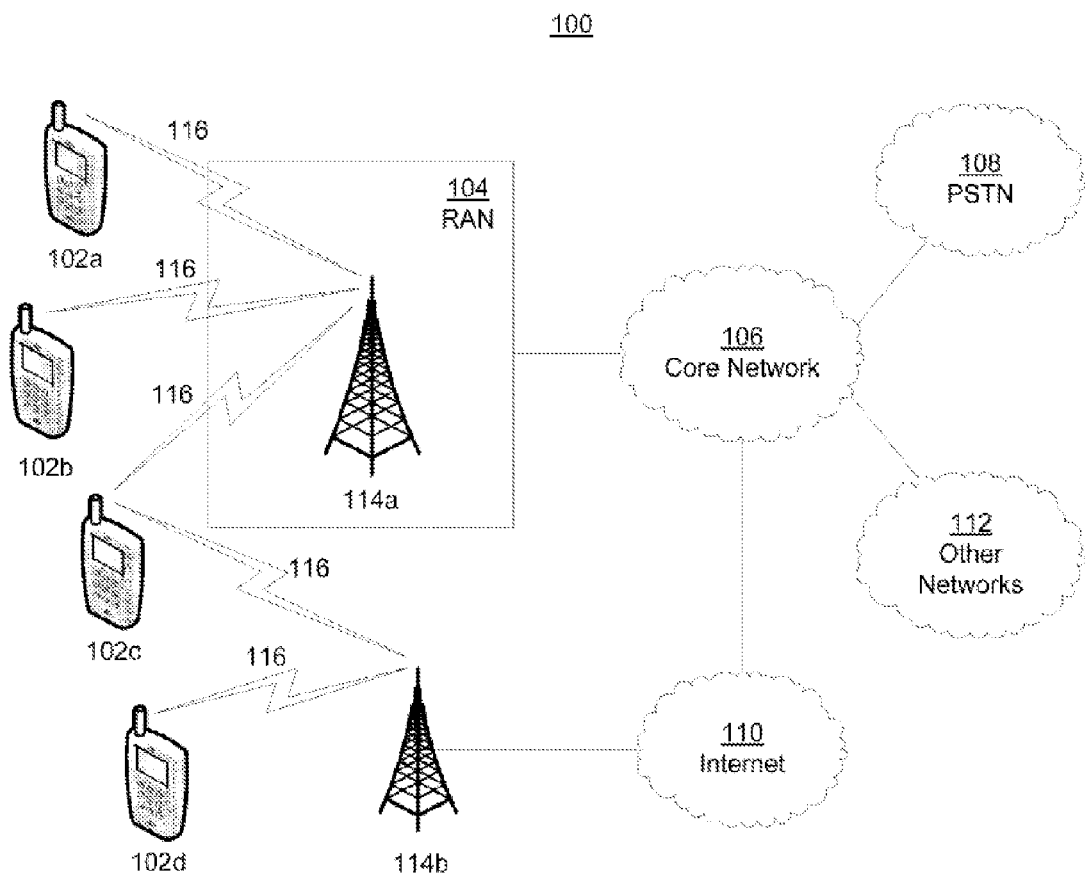
FIG. 2A shows an example of a communications system in which one or more disclosed embodiments may be implemented.

FIG. 2A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel, access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 100 may include wireless transmit/receive units (WTRUs) 102a, 102h, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment, such as a WSD, for example. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an evolved Node-B (eNode-B), a home Node-B, a ReNB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell, in another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102h, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDmA, and the like. For example, the base station 114a in the RAN 104 and the WTRUs 102a, 102b, 102c may implement a radio technology such as universal mobile telecommunications system (UMTS) Terrestrial Radio Access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102h, 102c may implement a radio technology such as evolved UMTS terrestrial radio access (E-UTRA), which may establish the air interface 116 using LTE and/or LTE-advanced (LTE-A).

In other embodiments, the base station 114a and the WTRUs 102a, 102h, 102c may implement radio technologies such as IEEE 802.16 (i.e., worldwide interoperability for microwave access (WiMAX, CDMA2000, CDMA2000 1X, CDMA2000 EV-DO, interim standard 2000 (IS-2000), interim standard 95 (IS-95), interim standard 856 (IS-856), GSM, EDGE, GSM EDGE (GERAN), and the like.

The base station 114b in FIG. 2A may be a wireless router, home nodeB, HeNb, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 2A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102h, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 2A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 2A may be configured to communicate with the base station 114a, which may employ a cellular-based radio technology, and with the base station 114b, which may employ an IEEE 802 radio technology.

Figure 2B:
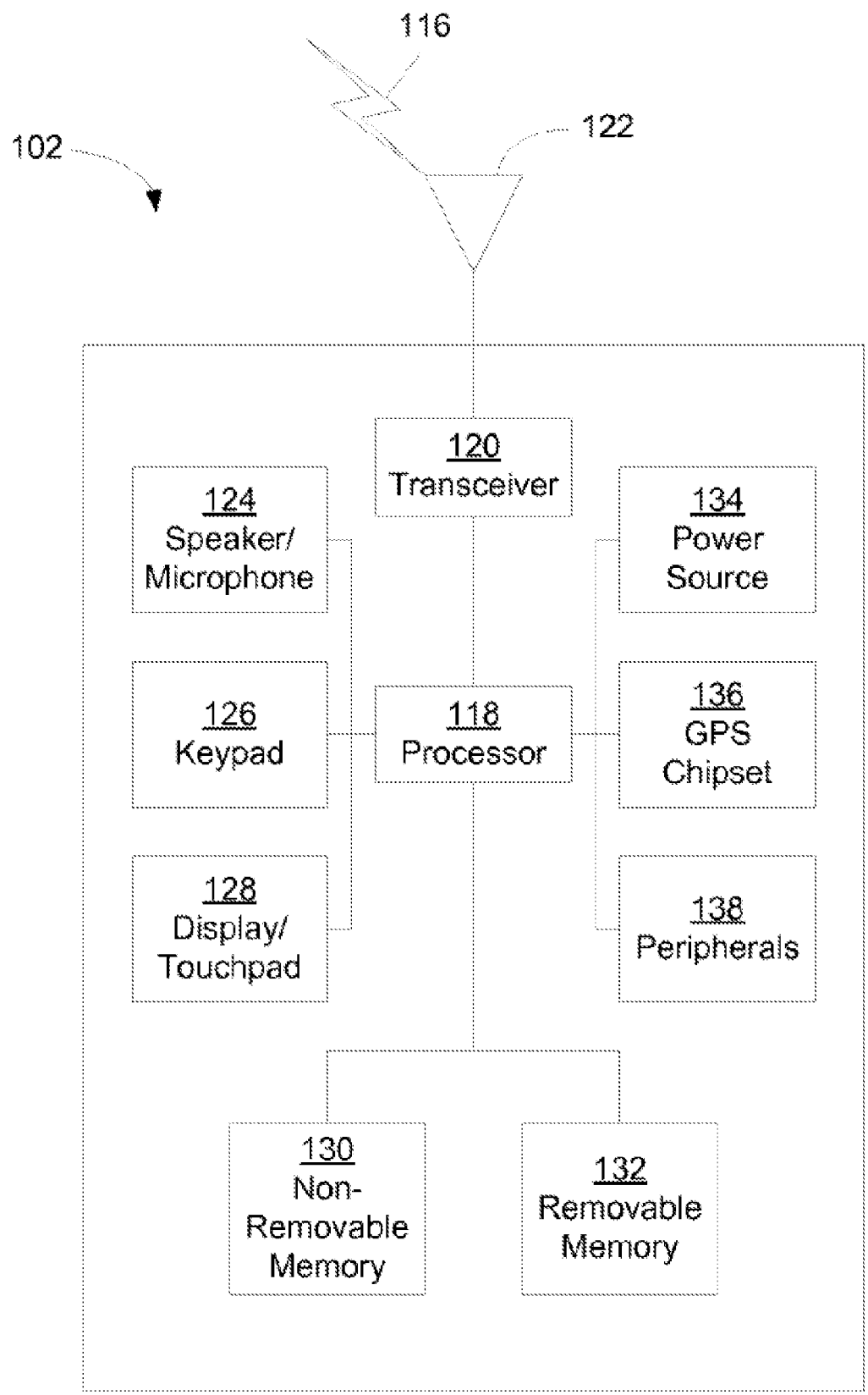
FIG. 2B shows an example of a wireless transmit/receive unit (WTRU) that may be used within the communications system illustrated in FIG. 2A.

FIG. 2B is a system diagram of an example WTRU 102. As shown in FIG. 2B, the WTRU 102 may include a processor 118, a transceiver 120, a transmit/receive element 122, a speaker/microphone 124, a keypad 126, a display/touchpad 128, computer-readable media in the form of non-removable memory 106, and/or removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 2B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touch pad 128. In addition, the processor 118 may access information from, and, store data in, any type of suitable memory, such as the non-removable memory 106 and/or the removable memory 132. The non-removable memory 106 may include random access memory (RAM), read-only memory (ROM), a hard disk, or any other type of memory storage device. The removable memory 132 may include a subscriber identity module (81M) card, a memory stick, a secure digital (8D) memory card, and the like. In other embodiments, the processor 118 may access information, from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), (Li-ion), etc.), solar cells, fuel cells, and the like.

The processor 118 may also be coupled to the UPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional, features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
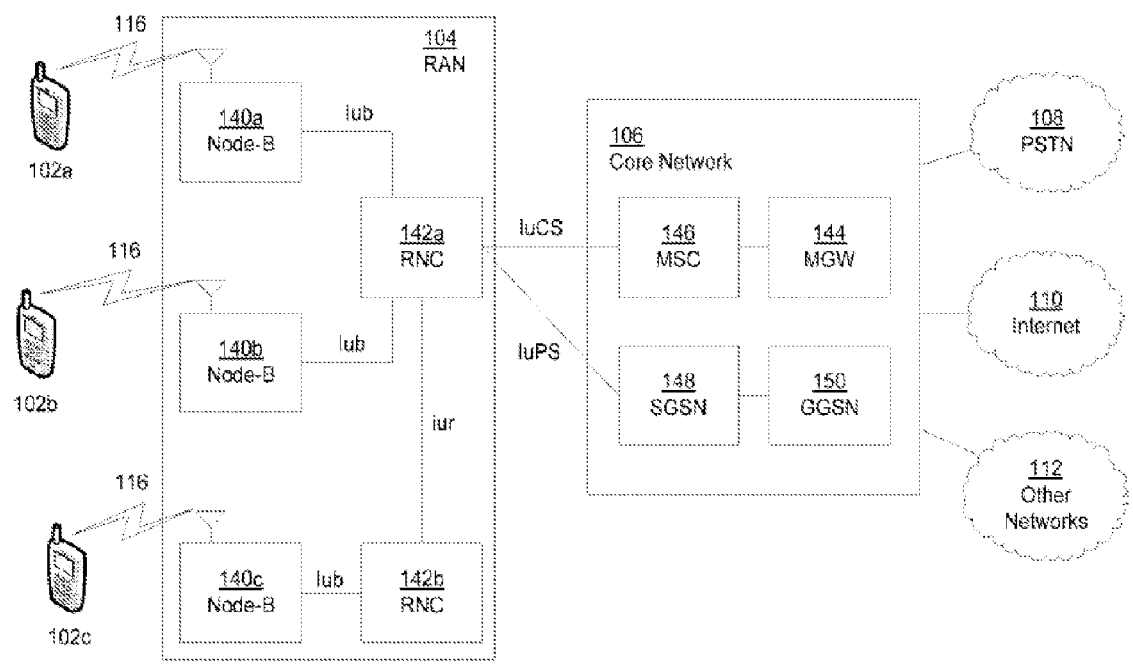
FIG. 2C shows an example of a radio access network and a core network that may be used within the communications system illustrated in FIG. 2A.

FIG. 2C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 2C, the RAN 104 may include base stations 140a, 140h, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140h, 140c and the ASN gateway 215 may be defined as an R6 reference point. The R6 reference point may include protocols for facilitating mobility management based on mobility events associated with each of the WTRU s 102a, 102b, 100c.

As shown in FIG. 2C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that anyone of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 2C, it will be appreciated that the RAN 104 may be connected to other ASNs and the core network 106 may be connected to other core networks. The communication link between the RAN 104 the other ASN s may be defined as an 114 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

In accordance with the presently disclosed systems and methods, the following functions may be used with a WINS database (WSDB):

local handling of channel queries, in which a channel query by a WSD is handled by a local DSM server if the DSM server has all the information necessary for providing a response to the channel query;

search extension, in which a WSDB passes part of a search for available channels to a local DSM server;

assisting of available channel calculation, in which a DSM server provides local spectrum sensing information to WSDBs to improve the available channel calculation within the WSDBs; and Dynamic bandwidth management to aid with coexistence requirements and issues such as fragmented spectrum.

In addition, messages and procedures are disclosed that enable the above value-adding functions and interactions with the WSDB systems.

First, the logical communication between DSM systems and WSDBs in accordance with various embodiments will be described, and then the functions for the WSDBs will be described, followed by the procedures and message flows that enable the described functions and interactions with the WSDBs.

Figure 3A:
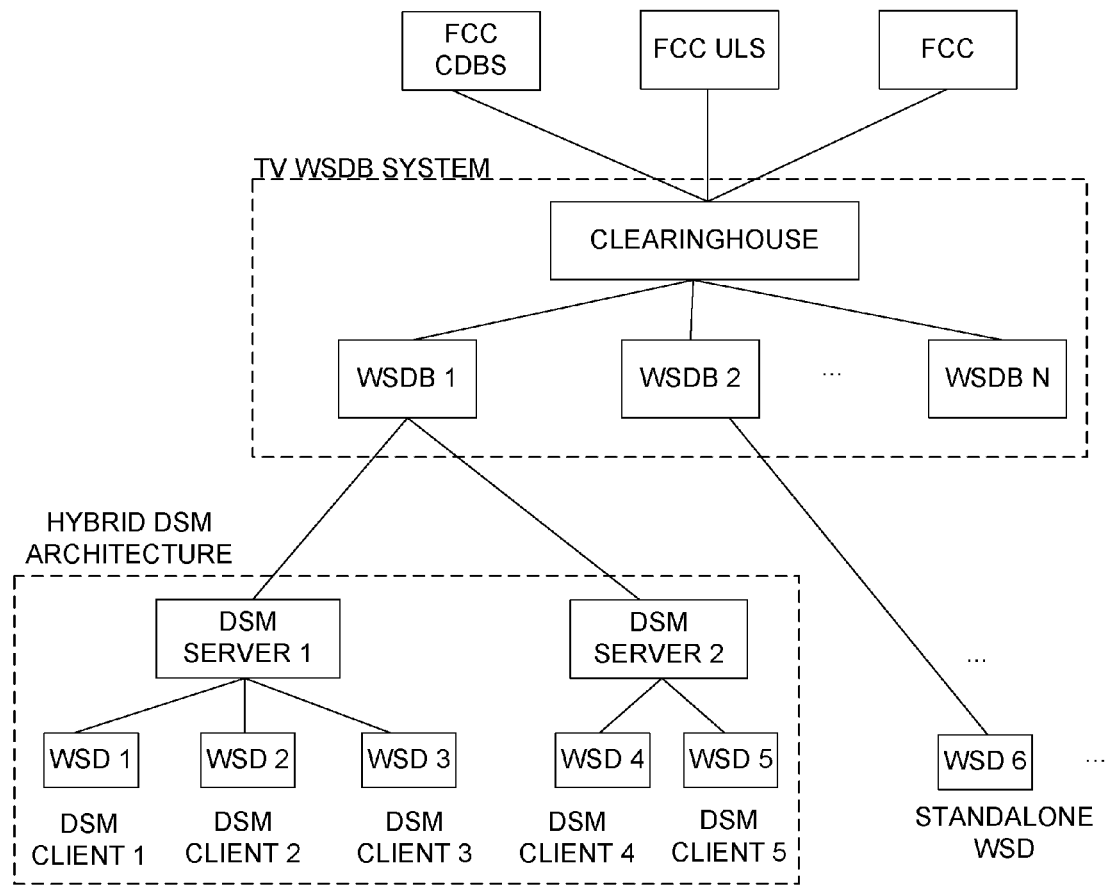
FIG. 3A shows logical communication between dynamic spectrum management (DSM) systems and a TV white space database (WSDB) system.

The logical communication in accordance with one non-limiting embodiment between DSM systems and WSDBs is shown in FIG. 3A. The FCC consolidated database system (CDBS) and FCC universal licensing system (ULS) record the protected locations and channels of licensed WSDs (e.g., TV stations, wireless microphones) and are updated periodically by the FCC. The block FCC is used for other communications between FCC and the WSDB system. As described in more detail below, the WSDB may communicate with WSDs directly or indirectly.

In some of the WSDB systems and methods described herein, a WSD logically directly communicates with a WSDB. As an example, a standalone WSD, WSD 6, sends a channel query message directly addressed to WSDB 2. The message may be relayed, e.g., through the Internet. WSDB 2 generates a list of vacant channels and sends back a channel reply message to WSD 6 containing the list. The content of the various messages between the WSD and the WSDB is discussed in more detail below.

FIG. 3A illustrates a hybrid DSM architecture in accordance with some embodiments. Generally, WSDs can act as DSM clients and establish connections with a DSM server, which could be a WSD, access point, or any other suitable type of communication device. As illustrated in FIG. 3A, a DSM server may effectively act as the cluster head of a cluster of WSDs.

In the system and methods described herein, a WSD may directly communicate with a WSDB. As an example, in FIG. 3B, WSD 6 directly communicates with a WSDB to get a list of channels that are vacant in the geographical area in which WSD 6 is located. In one embodiment, WSD 6 and the WSDB 2 may exchange the following messages:

Message 1: WSD 6 sends a channel query message to WSDB 2. The physical transmission may not necessarily be 1-hop, but, in any event, logically WSD 6 directly communicates with WSDB 2, i.e., the message is addressed to WSDB 2.

Message 2: WSDB 2 searches its databases, calculates the available channels, finds a list of vacant channels for WSD 6, and sends a channel reply message back to WSD 6, which will use the message and, optionally, its local sensing information to determine which channel it can access.

Figure 3B:
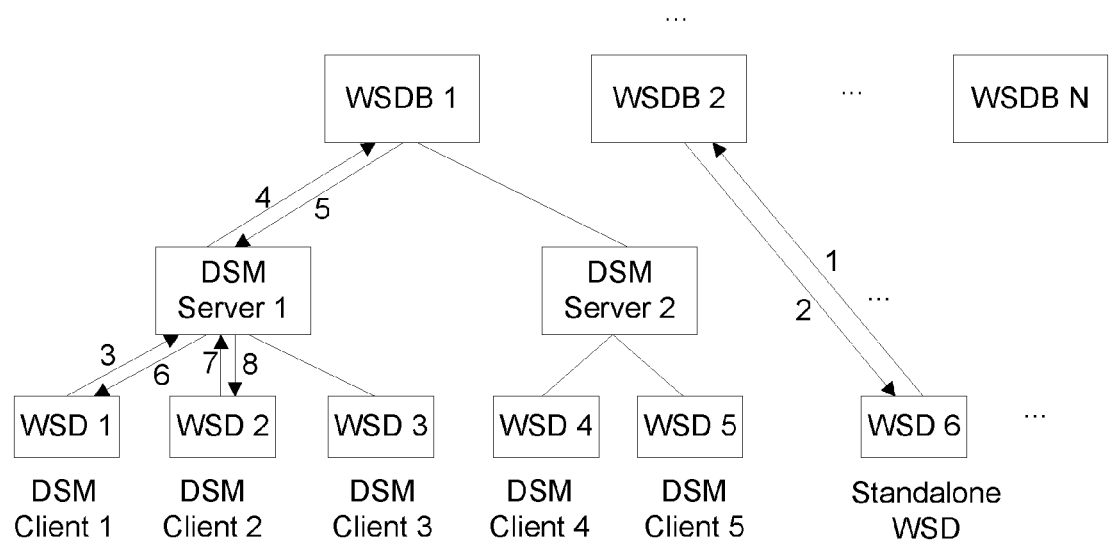
FIG. 3B shows message flows for implementing local handling of channel queries, whereby other components of the WSDB system and the FCC databases are omitted for clarity.

As described in more detail below, the DSM architecture may offer richer means to do the channel query. In addition, it allows two processes, channel query and spectrum allocation, to be performed at the same time. For example, a WSD sends a channel query message to its DSM server. If the DSM server has all the information needed to find a list of vacant channels for that WSD, the DSM server will use this list and the sensing information it has to perform spectrum allocation, and send a channel reply message to the WSD. Otherwise, the DSM server will send a channel query message to a WSDB on behalf of the WSD. The WSDB sends a channel reply message to the DSM server, which will use the channel, reply message and the sensing information, it has to perform spectrum allocation and send a channel reply message to the WSD. These interactions, in accordance with one non-limiting embodiment, are illustrated in FIG. 3B. In the event that DSM server 1 does not have all the information needed to handle channel, query messages from WSD 1, the message flow may be as follows:

Message 3: WSD 1 sends a channel query message to DSM server 1.

Message 4: DSM server 1 sends a channel query message to WSDB 1, stating the ID, location, and device type and other relevant information of WSD 1.

Message 5: the WSDB 1 sends a channel reply message to DSM server 1, specifying the vacant channels for WSD 1.

Message 6: DSM server 1 uses the list of vacant channels for WSD 1 contained in the channel reply message sent by WSDB 1, together with the sensing information available or other supplemental spectrum usage data available to DSM server 1, to generate a spectrum allocation, and sends a channel reply message to WSD 1.

Now, in the event that DSM server 1 has all the information, needed to handle the channel query messages from WSD 2, the message flow may be as follows:

Message 7: WSD 2 sends a channel, query message to DSM server 1.

Message 8: DSM server 1 finds the vacant channels for WSD 2, uses the supplemental spectrum usage data, such as sensing information available to DSM server 11 to generate a spectrum allocation, and sends a channel reply message to WSD 2.

In one embodiment, the channel reply message provides more information than a channel reply message in the case of a standalone WSD (a WSD not connected to any DSM server) does. In the case of a standalone WSD, the channel reply specifies the vacant channels for that WSD. However, the WSD still may have to do spectrum sensing before determining which of the vacant channels can be accessed. In the case where a WSD is connected to a DSM server, the channel reply message may specify a single channel (which could be contiguous or non-contiguous in spectrum) or no channels ready for the WSD to access, with spectrum sensing information already taken into account in selecting the single vacant channel.

Figure 4:
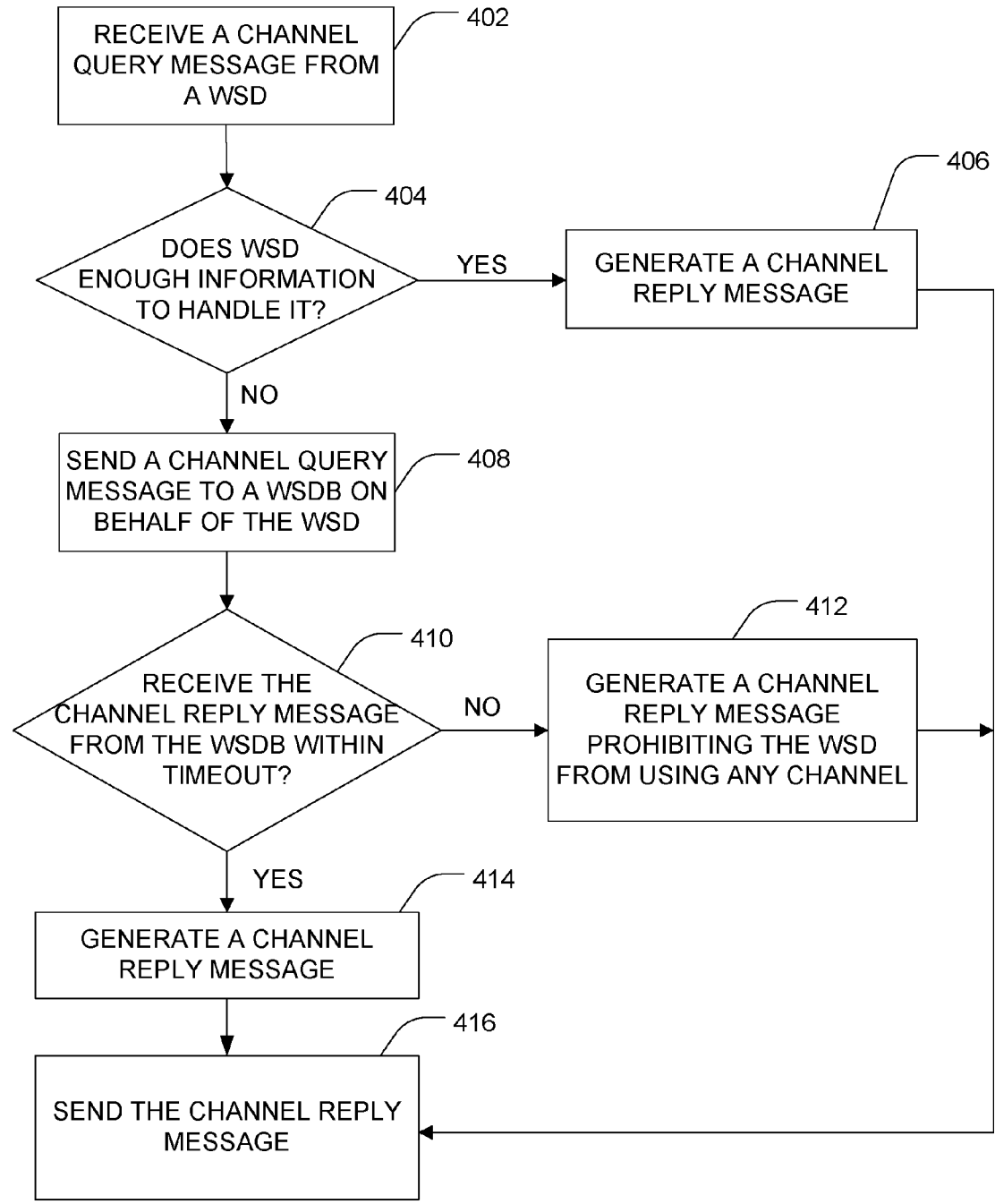
FIG. 4 shows a flow chart for a DSM server that handles a channel query message from a white space device (WSD) in accordance with one non-limiting embodiment.

A flow chart for a DSM server is shown in FIG. 4 in accordance with one non-limiting embodiment. At 402, a channel message from a WSD is received. At 404, it is determined if the WSD has enough information to handle the channel query. If it has enough information, at 406, a channel reply message is generated. The channel reply message may specify, for example, the allocated channel for the WSD. The channel reply message may then be sent at 416. If DSM server does not have enough information to handle the channel query message, at 408, a channel query message may be sent to a WSDB on behalf of the WSD. At 410, it is determined if the channel reply message was received from the WSDB within the timeout period. If it was not, at 412, a channel reply message may be generated prohibiting the WSD from using any channel. If the DSM server does receive a channel reply message from the WSDB, at 414, a channel reply message may be generated. The channel reply message may specify, for example, the allocated channel for the WSD. At 416, the channel reply message may be sent to the WSD that originally sent the channel query message.

Figure 4A:
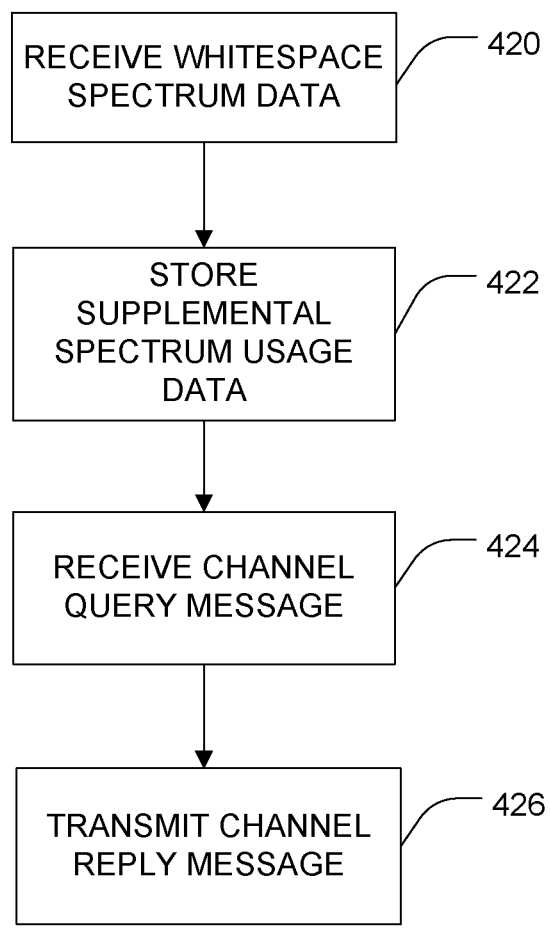
FIG. 4A shows a flow chart for a DSM in accordance with one non-limiting embodiment.

A flow chart for a DSM server is shown in FIG. 4A in accordance with another non-limiting embodiment. At 420, whitespace spectrum data is received from a whitespace data repository server. The whitespace spectrum data may include available frequency range data. Generally, whitespace spectrum is a spectrum, which may be licensed, in which particular types of operation by unlicensed devices is permitted. For example, various white space devices may be permitted to operate in a predetermined location and on channels (e.g., frequency ranges) that are either unused by a licensee in that location or are not licensed in that location. One example of whitespace spectrum is TV whitespace spectrum that is licensed to a broadcaster in a particular region, but which is presently not used. Whitespace spectrum data may include information about the whitespace spectrum, including unlicensed spectrum. It may also include available frequency range data, as described below. It may also include other information, such as location identification data, or other descriptions or characterizations of the unlicensed spectrum, such as channel-specific power limitations, guard band template requirements, time limitations/restrictions, for example. The whitespace data repository server (e.g., a WSDB) may be a static or dynamic database of location-specific spectrum info for available frequency ranges. In some embodiments, the whitespace data repository server may track spectrum that is dedicated and permanently unavailable. Available frequency range data may be information that identifies what spectrum is available in the whitespace spectrum. It may, for example, be analog TV channel designators or channel IDs. Alternatively, it may be in the form of center frequencies and associated bandwidths (expressed or implicit), or a paired list of frequencies, for example. With respect to television whitespace (TVWS), a TVWS channel is fixed to 6 MHz per channel (e.g., channel 23 always refers to 524-530 Mhz.) The available frequency range data may be expressed in terms of channel, numbers. In addition, if two or more consecutives channels are available, a whitespace channel selection may aggregate available channels and increase the bandwidth to 10 MHz, 15 MHz, 20 MHZ, etc. That is, various radio access technologies may utilize multiple consecutive channel bandwidths. For example, both LTE and WIFI may be deployed over a single TVWS channel (6 MHz) using a 5 MHz OFDM bandwidth, or over two consecutive TVWS channels using 10 MHz OFDM bandwidth, or over four TVWs channels using 20 MHz OFDM bandwidth.

At 422, supplemental spectrum usage data is stored. Supplemental spectrum usage data may include, for example, other information available to the DSM to obtain the preferred frequency range data, as described below. Thus, the supplemental spectrum usage data may contain information that reflects the current state of spectrum usage, and which could include spectrum measurement data from WSDs, usage maps of currently assigned/used spectrum from the DSM or peer DSMs, and so forth. The current state of spectrum usage may include the particular Radio Access Technologies being used as well as key parameters defining how this technology is being used to facilitate coexistence, such as scrambling code being used (e.g., PHY cell ID) or time references, for example. In some embodiments, the supplemental spectrum usage data may include whitespace access point interdependency information. Whitespace access point interdependency information may, for example, identify overlapping AP coverage. Using the interdependency information, a DSM Server may construct a logical interdependencies mapping for each AP under its control by identifying for a given AP which other APs have overlapping coverage in TVWS. The DSM may use this information to determine potential interference among the APs under its direct control or through the control of other DSM servers. This association may, for example, be derived from the geo-location of each AP, and may also be complemented with spectrum sensing information, collected by the APs themselves, or from other sources. Information from other DSM servers (peer DSM devices) may also be obtained by the DSM server in developing the interdependencies mapping. For example, a WIFI AP may report the SSID of neighbor APs causing interference as well as the relative signal strength of the neighbor APs to the DSM Server. In LTE, a HeNB may report information of neighbor APs and its associated SSID as well as neighbor HeNB and its associated physical Cell ID and possibly PLAIN network identification to the DSM Server. The same information may be relayed to other DSM servers impacted. The supplemental spectrum usage data may also include spectrum measurement data. The spectrum measurement data may be obtained from one or more whitespace device access points (WSD-AP). The spectrum measurement data may be obtained from one or more WSDs or other spectrum measurement technologies. The spectrum measurement data may include SSID information of other WSD-APs, or the LTE cell ID, and may also include corresponding power levels. Radio access technology identifiers that indicate whether 802.11 technology, LTE, or other technology is being used, may be included. The spectrum measurement data may be transmitted in the form of a channel usage measurement report, either between peer WSD-APs, between peer DSMs, or between WSD-APs and DSMs, for example.

At 424, a channel query message is received. The channel query message may be received by a DSM from a WSI) (WSD/AP), for example.

At 426, a channel reply message is transmitted. The channel reply message may include, for example, at least one preferred frequency range data. The at least one preferred frequency range data may be determined in part based on the whitespace spectrum data and the supplemental spectrum usage data. The at least one preferred frequency range data may be determined based on identifying available frequency ranges adjacent to presently used spectrum. In some embodiments, the at least one preferred frequency range data is determined based on a contiguous spectrum criterion. The at least one preferred frequency range data may include information that is sent to the WSD/AP from which it may choose a channel. This data may also include other channel data, such as, without limitation, channel-specific power limitations, guard band template requirements, time limitations/restrictions, and/or channel-specific control messaging requirements, for example. In other words, some channels may have certain requirements (e.g., the use of a heartbeat mechanism to indicate continued usage). The preferred frequency range data may be transmitted in any suitable format, such as a format similar to the "available frequency ranges" (i.e., using TV channel designators/IDs, center frequencies and bandwidths, a paired list of frequencies, etc.) In one embodiment, the preferred frequency comprises a channel list. The channel list may include channel preference information.

Figure 4B:
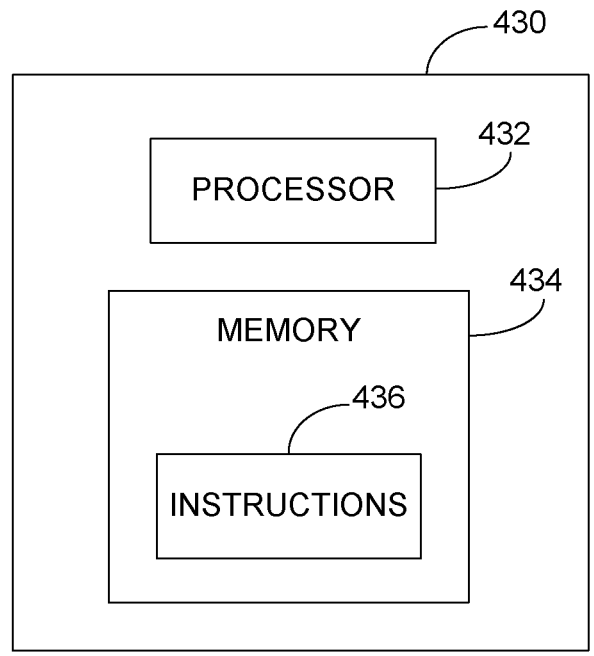
FIG. 4B shows a DSM device 430 in accordance with one non-limiting embodiment.

When identifying preferred frequency ranges, the DSM or WSD-AP may select frequency ranges or channels in a manner that preserves larger contiguous blocks of unused spectrum so that other channel queries that request larger blocks of spectrum may be serviced. That is, if the selection of one channel tends to preserve a block of contiguous spectrum, while the selection of another channel, tends to segment the remaining available spectrum, then the first channel is preferred. Alternatively, the preservation of contiguous spectrum may be performed based on geographic regions. That is, the preservation of contiguous spectrum blocks in a first geographic region may be prioritized over other regions such that channel selection that results in spectrum fragmentation in one region may still be preferred due to the preservation of a contiguous block in an adjacent or overlapping region that is deemed to have priority. Contiguous spectrum prioritization may also be based on usage statistics such that areas with more frequent high-bandwidth requests are prioritized over other regions. The various embodiments of contiguous spectrum management and/or prioritization described herein may be said to use a contiguous spectrum criterion when identifying one or more preferred frequency ranges, or when ranking the available frequency ranges. In some embodiments, the WSD-AP is provided a channel, list of available channels, and the WSD-AP then may utilize the contiguous spectrum criterion when identifying the frequency range to use. In other embodiments, the WSD-AP may communicate with a whitespace data repository server and then select a channel to reduce fragmentation according to a contiguous spectrum criterion. In some embodiments, the DSM server may also receive a channel reply message from a WSD/AP indicating a channel selection, The DSM server may also receive a channel acknowledgement message indicating the channel usage. For example, the channel acknowledgement message may be an indication that the channel is being used (e.g., via an ACK message), it may identify which channel of the list was selected for use, or it may include other channel acknowledgement data. FIG. 4B shows a DSM device 430 in accordance with one non-limiting embodiment. The DSM device 430 may comprise a processor 432 and a computer memory 434 or other computer-readable media in communication with the processor 432. Software with instructions 436 for execution by the processor 432 may be stored on the computer memory 434. The processor may execute the software to perform various functions, such as the dynamic spectrum management described herein. The DSM device 430 may comprise one or more processors 432 and one or more computer memories 434. For convenience, only one processor 432 and only one memory 434 are shown in FIG. 4B. The processor 432 may be implemented as an integrated circuit (IC) having one or multiple cores. The computer-readable media or memory may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

Figure 4C:
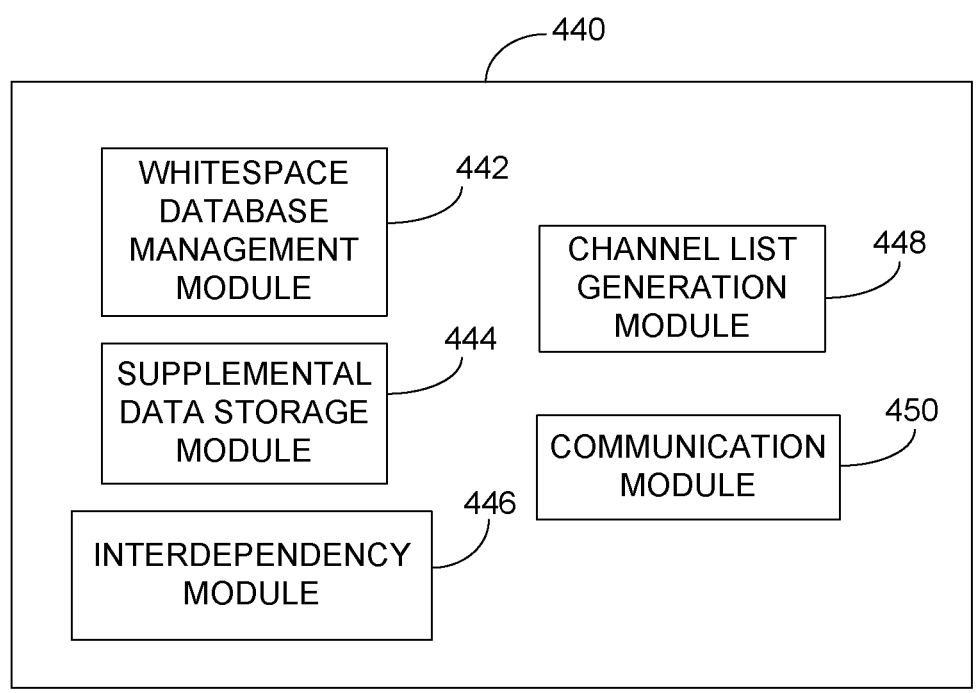
FIG. 4C shows an architecture of DSM server in accordance with one non-limiting embodiment.

FIG. 4C shows an architecture of DSM server 440 in accordance with one non-limiting embodiment. The one or more processors executing the software instructions may be considered to implement various modules of the device. The DSM server 440 may include a whitespace database management module 442. The whitespace database management module 442 may be configured to store whitespace spectrum data from a whitespace data repository server. The whitespace spectrum data may include available frequency range data. The DSM server 440 may also include a supplemental, data storage module 444 configured to store supplemental spectrum usage data. The DSM server 440 may also include an interdependency module 446 configured to identify relevant supplemental data based at least in part on whitespace device location information. The DSM server 440 may also include a channel list generation module 448 configured to identify at least one preferred frequency range data. The at least one preferred frequency range data determined in part based on the whitespace spectrum data and the supplemental spectrum usage data. The DSM server 440 may also include a communication module 450 adapted to communicate with a peer DSM, a whitespace device, and a whitespace data repository server.

When the WSD needs to send a channel query message, it tests the condition whether it is connected to a DSM server or not. If yes, it will send a channel query message to the DSM server, and access the channel contained in the channel reply message. On the other hand, if the WSD is not connected to a DSM server, but knows the existence of a WSDB, it will send a channel query to the WSDB. When the channel reply message comes back from the WSDB, the WSD will use the list of vacant channels in the channel reply message and its local spectrum sensing information to determine which channel in the list can be accessed.

Figure 5:
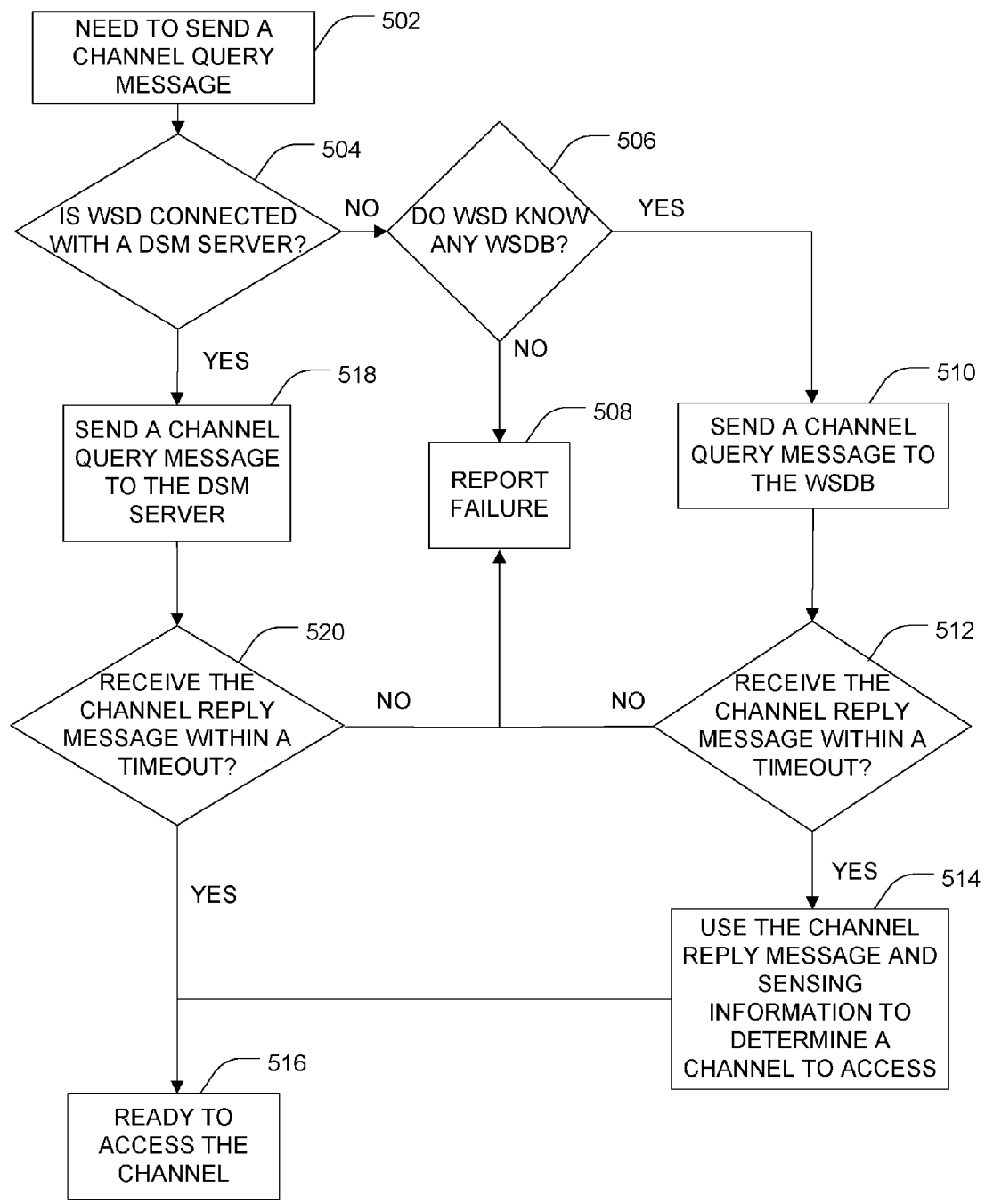
FIG. 5 shows a flow chart for a WSD handling a channel query in accordance with one non-limiting embodiment.

A flow chart for a WSD is shown in FIG. 5 in accordance with one non-limiting embodiment. At 502, it is determined that a channel query message needs to be sent. At 504, it is determined is the WSD is connected with a DSM server. Is it is not, at 506, it is determined if the WSD knows any WSDB. If not, a failure is reported at 508. If the WSD does know a WSDB, a channel query message is sent to the WSDB at 510. At 512, it is determined if a channel reply message is received within, a timeout period. If a channel reply message is received, at 514, the channel reply message and sensing information may be used to determine a channel to access. At 516, the WSD is ready to access the channel. If it is determined at 504 that the WSD is connected to a DSM server, at 518 a channel query message may be sent to the DSM server. At 520, it is determined if a channel reply message is received within a timeout period. If it is not received, a failure is reported at 508. If a channel reply message is received, at 516, the WSD is ready to access the channel.

Figures 5A, 5B:
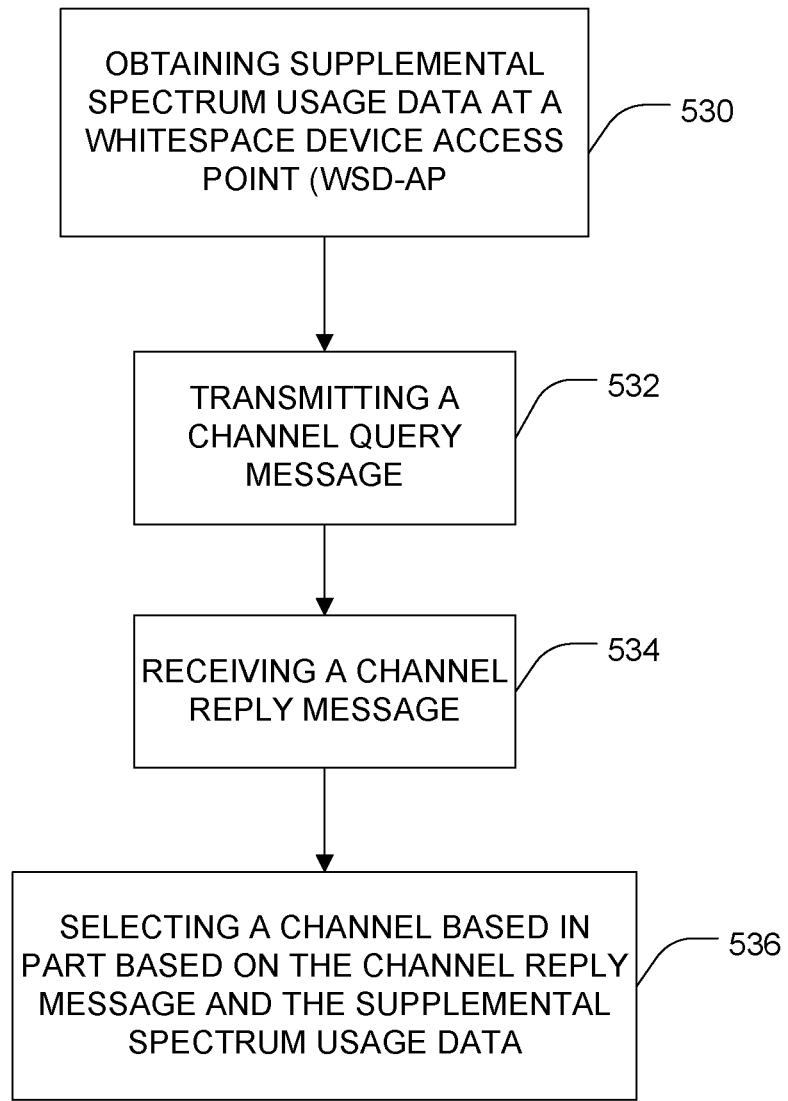
FIG. 5A shows a flow chart for a WSD in accordance with one non-limiting embodiment.
FIG. 5B shows example Channel Switch Announcement information fields for a switch announcement.

In some embodiments, supplemental spectrum usage data may be Obtained at a whitespace device access point (WSD-AP). A flow chart for a WSD is shown in FIG. 5A in accordance with one non-limiting embodiment, At 530, supplemental spectrum usage data is obtained at a whitespace device access point (WSD-AP). At 532, a channel query message is transmitted. At 534, a channel reply message is received. The channel reply message may include at least one preferred frequency range data. At 536, a channel is selected based in part based on the channel reply message and the supplemental spectrum usage data. In some embodiments, a channel acknowledgement message may be transmitted indicating the selected channel. The channel acknowledgement may be any suitable type of message, such as an ACK message, or may alternatively identify which channel of the list was selected for use in the event that the channel reply message includes a list of channels. In some embodiments, a channel reconfiguration message may be received at the WSD-AP from a dynamic spectrum management (DSM) device and a channel change message to may be transmitted to client whitespace devices.

In Wifi (IEEE 802.11) scenarios, the AP may broadcast a channel change using a channel switch announcement which can be sent either in the beacon through CSA (Channel Switch Announcement) or ECSA information elements or as a separate MAC action frame. CSA contains the information about the new channel and indicates the time to switch to the new channel. FIG. 5B illustrates example CSA information fields for a switch announcement.

In LTE, the HeNb may signal a channel change to a UE using RRC signaling sent over the primary cell. The primary cell may use a different band such as licensed spectrum. In some embodiments, a channel change may be performed through two consecutive messages. First, a first RRC message terminates the secondary cell operating in the current TVWS channel using a RRC reconfiguration message. Second, another RRC message activates the secondary cell to operate over the new TVWS channel through a RRC reconfiguration message.

Figure 6:
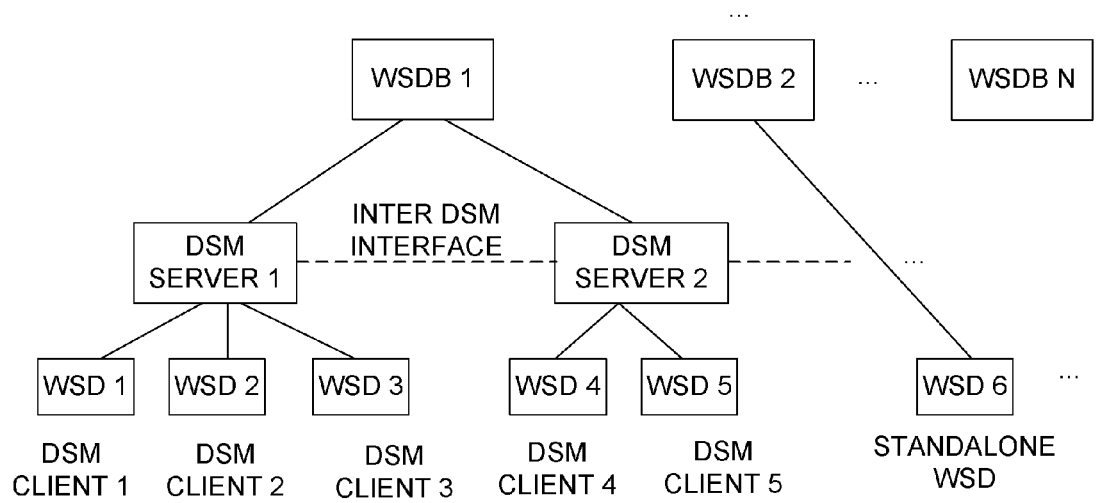
FIG. 6 shows an example inter-DSM interface.

Referring now to FIG. 6, in some embodiments, there may also be an interface between one or more DSM servers. This interface may help the DSM server to share the TVWS channel information and can assist them realizing a more complete picture of the TVWS spectrum.

This inter-DSM interface can be used for coexistence purposes. Initially when the DSM server receives the list of channels from WSDB it may know which channels are already being used by the WSDs operating under other DSM servers, therefore the DSM server would make use of "inter-DSM" interface to acquire information of other operating channels. It will then select the vacant channel from the initial available channel list, i.e., the channel not being used by any other DSM server/client in that geographical area. The communication can be made through a channel Usage Message, as discussed in more detail below.

Figure 7:
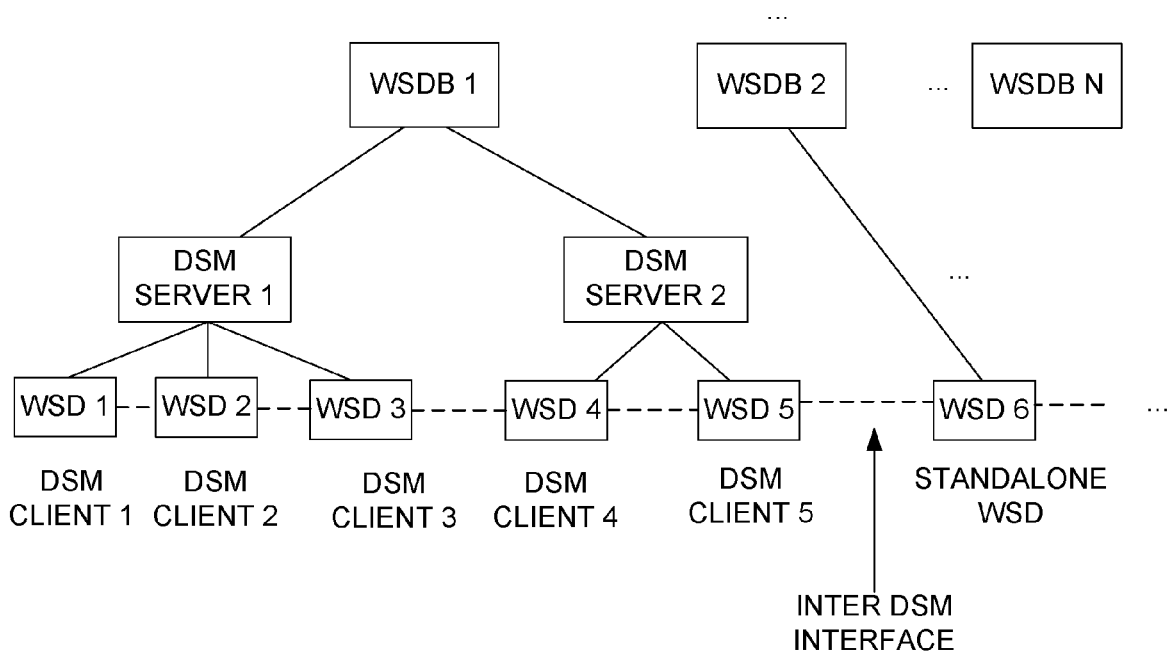
FIG. 7 shows an example inter-WSD interface.

In some embodiments, the inter-DSM interface can be implemented at a WSD level. For example, its interface may have the same functionality but instead of being implemented at the DSM level, it shares spectrum information at the WSD level. This type of interface may be more useful for standalone WSD which are connected directly to WSDB as shown in FIG. 7.

This "inter-WSD" interface may also be used for coexistence in TVWS. The WSDs may share information about the operating channel in TVWS and can assist each other in channel selection using "inter-WSD" interface. This will eliminate, or at least reduce, the likelihood that two WSDs in the same geographical area select the same channel in TVWS. In some embodiments, a hybrid, system may be used with both "inter-DSM" and "inter-WSD" interfaces.

In addition, an ad hoc mode may be used for local handling of channel queries. In this mode, the WSDs are peer devices. If a WSD has already contacted the WSDB, obtained and kept a list of vacant channels, it is likely that the information on vacant channels applies to the WSDs in its neighborhood as well, because the neighboring WSDs are likely to fall into the geographical area set by the WSDB.

In some embodiments, the channel availability information is associated with one or more timers. For example, each channel in the vacant channel list may have a separate timer. A vacant channel is marked as obsolete or is deleted from the list when its timer expires.

In some embodiments, when a standalone WSD sends a channel query message to a WSDB, the WSDB sends back a channel reply message which specifies a list of vacant channels for that WSD. A standalone WSD typically has limited spectrum sensing capability, as it has access only to spectrum measurements made for one location. In some implementations, at least one DSM server near a standalone WSD helps that standalone WSD. For example, the WSDB to which a standalone WSD sends a channel query message may work with DSM server(s) near that standalone WSD and together generate a spectrum allocation for the standalone WSD. Thus, the WSDB may extend the search for available channels for the WSD to DSM servers.

In some embodiments, search extension can be applied to WSDs that are under DSM servers with limited sensing capability as well. For those DSM servers, when they receive a channel query message from a WSD, they may forward the WSD message to a WSDB, and the WSDB tries to work with other DSM servers to resolve this channel query. In one embodiment, this process begins with a WSD sending a channel query directly or via a DSM server with limited sensing capability to a WSDB. The WSDB may then look up a list of vacant channels for the standalone WSD. The WSDB may also look up whether there is a DSM server covering the location of the WSD. If there is none, the WSDB will send a channel reply message to the WSD, specifying a list of vacant channels. On the other hand, if there is one, the WSDB will send a channel query message to the DSM server on behalf of the WSD. Next, when the channel query from the WSDB reaches a DSM server, the DSM server may find a list of channels that are vacant for the WSD and send a channel reply message. When the channel reply message from the DSM server reaches the WSDB, the WSDB may combine the list with the list it already generated (e.g., in an "AND" fashion) determine which channel the WSD can access, and then send a channel reply message to the WSD.

Figure 8:
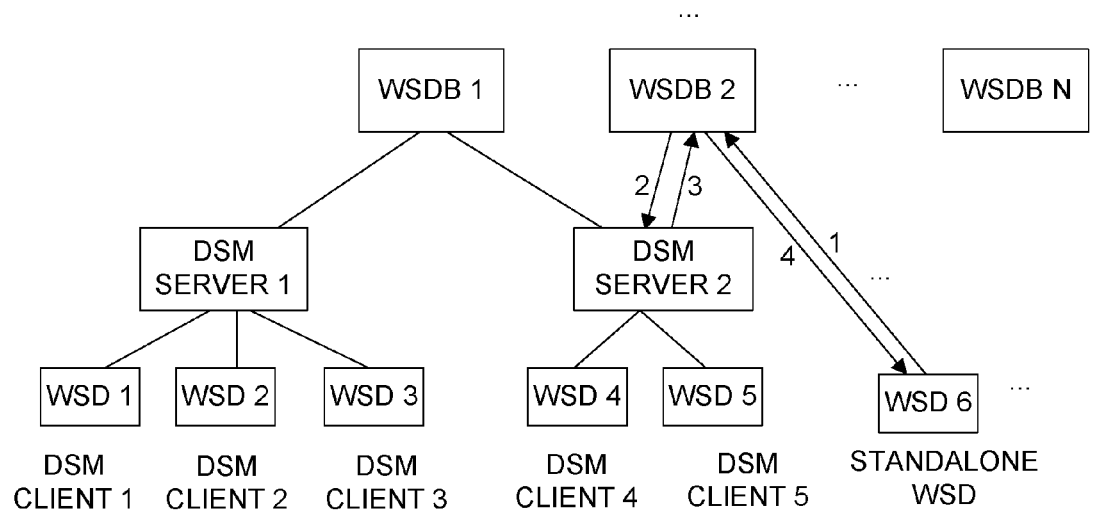
FIG. 8 illustrates improved handling of a channel query via a search extension.

As an example, consider WSD 6 illustrated in FIG. 8. In one embodiment, the message flow is as follows:

Message 1: WSD 6 sends a channel query message to WSDB 2.

Message 2: WSDB 2 finds a list of channels vacant for WSD 6, and it looks up DSM servers that cover the location of WSD 6 and finds DSM server 2. WSDB 2 sends a channel query message on behalf of WSD 6 to DSM server 2.

Message 3: DSM server 2 finds a list of unoccupied channels at the location of WSD 6 and sends a channel reply message to WSDB 2.

Message 4: WSDB 2 chooses a channel that is in both lists, generates a channel reply message and sends it to WSD 6.

Figure 9:
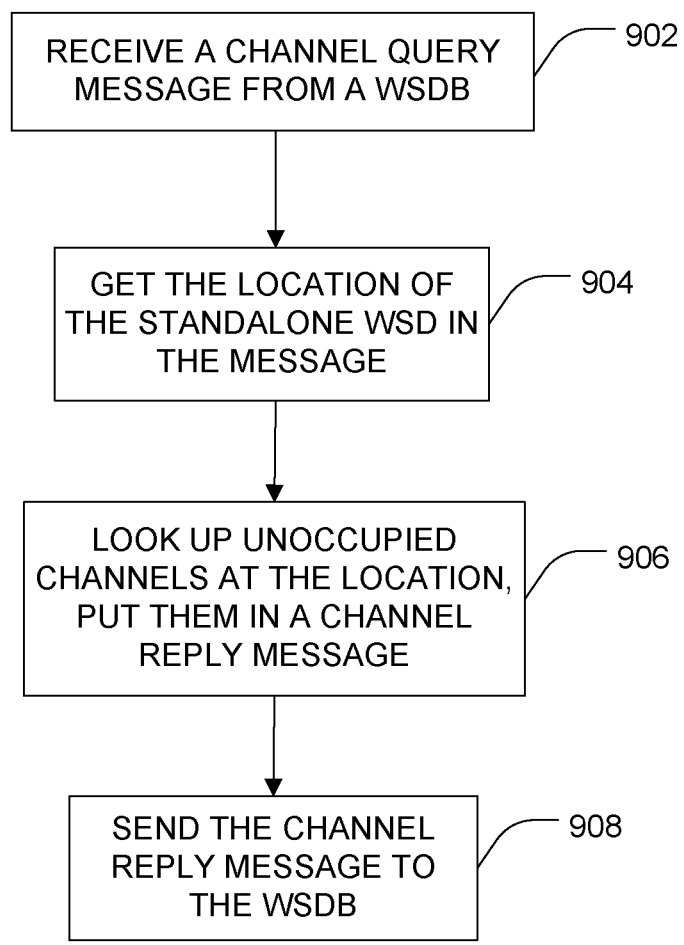
FIG. 9 shows a flow chart for a DSM server handling a channel query message sent by a WSDB in accordance with one non-limiting embodiment.
Figure 10:
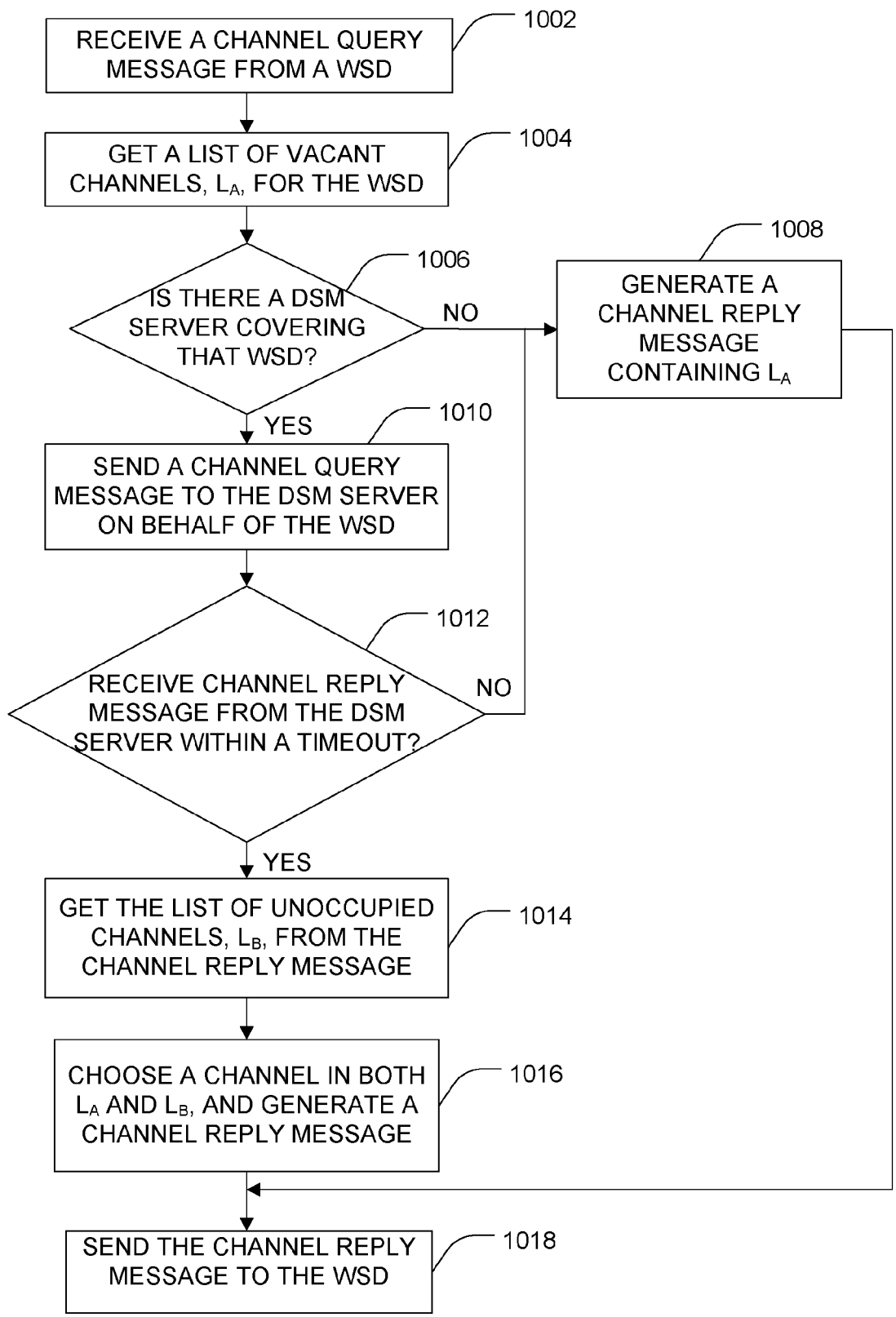
FIG. 10 shows a flow chart for a WSDB that extends its available channel search to a DSM server in accordance with one non-limiting embodiment.

In accordance with various non-limiting embodiments, the flow chart for a DSM server handling a channel query message from a WSDB is shown in FIG. 9, and the flow chart for a WSDB that extends the available channel search to a DSM server is shown in FIG. 10, in accordance with various non-limiting embodiments.

Referring now to FIG. 9, at 902, a channel query message is received from a WSDB. At 904, the location of the standalone WSD is the message is obtained. At 906, unoccupied channels at the location are looked up, and placed in a channel reply message. At 908, the channel reply message is sent to the WSDB.

Referring now to FIG. 10, at 1002, a channel query message is received from a WSD at 1002. At 1004, a list of vacant channels (LA) is obtained for the WSD. At 1006, it is determined if there is a DSM server covering (e.g., managing) that WSD. If there is not, at 1008, a channel reply message is generated containing the list of vacant channels (LA). If there is a DSM server covering that WSD, at 1010, a channel query message is sent to the DSM server on behalf of the WSD, At 1012, it is determined if a channel reply message is received from the DSM server within a timeout period. If it is not received, at 1008, a channel reply message is generated containing the list of vacant channels (LA). If a channel reply message is received, at 1014, a list of unoccupied channels (LB) is obtained from the channel reply message. At 1016, a channel may be selected that is in both LA and LB. At 1018, a channel reply message is sent to the WSD.

In addition, in some embodiments, the DSM system can assist the available channel calculation that a WSDB performs by passing the spectrum sensing results to the WSDB. The assistance may be offered in a variety of ways, such as using a proactive approach or a reactive approach, for example.

Using a proactive approach, a DSM system may proactively send the spectrum sensing results to a WSDB, and update the spectrum sensing results when there are significant changes in the spectrum usage that it observes.

Using a reactive approach a WSDB may query a DSM server for the spectrum sensing results at a particular location on an as-needed basis.

In both approaches, a WSDB may get the spectrum sensing results from one or more DSM servers near the location of interest. It can combine the spectrum sensing results to improve the calculation of available channels.

Generally, the proactive approach may be more efficient when the spectrum usage changes slowly, and may become inefficient as the spectrum usage changes quickly as the number of updates will increase. The reactive approach is on the opposite. It may be inefficient when the spectrum usage changes slowly, as each calculation of available channels may incur a query for spectrum sensing results and the queries bring similar spectrum sensing results. As the spectrum usage changes more quickly, the reactive approach may become more efficient because the WSDB only asks for the spectrum sensing results when it needs, eliminating the transmission of all the sensing update messages, which may be numerous.

Figure 11:
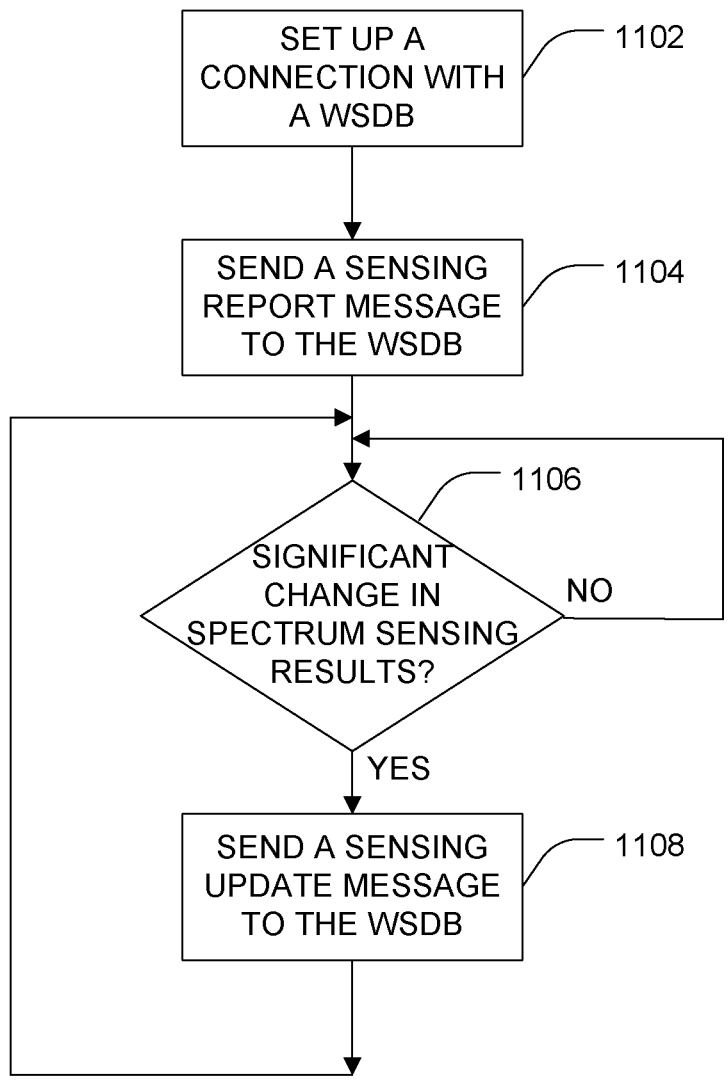
FIG. 11 shows a flow chart for a DSM server that proactively assists an available channel calculation in a WSDB in accordance with one non-limiting embodiment.

The flow chart for the DSM server for a proactive approach in accordance with one non-limiting embodiment is shown in FIG. 11. As illustrated, the process for the proactive approach may include the DSM server setting up at connection with a WSDB at 1102. At 1104, an initial sensing report message may be sent containing the spectrum sensing results for all channels to a WSDB. At 1106, if there are significant changes in the spectrum sensing results, the DSM server may send a Sensing Update message at 1108, which lists only those channels that have undergone changes since the last update, to the WSDB. The WSDB may then use the spectrum sensing results received from all DSM servers for its calculation of the available channels for a certain channel query.

Figure 12:
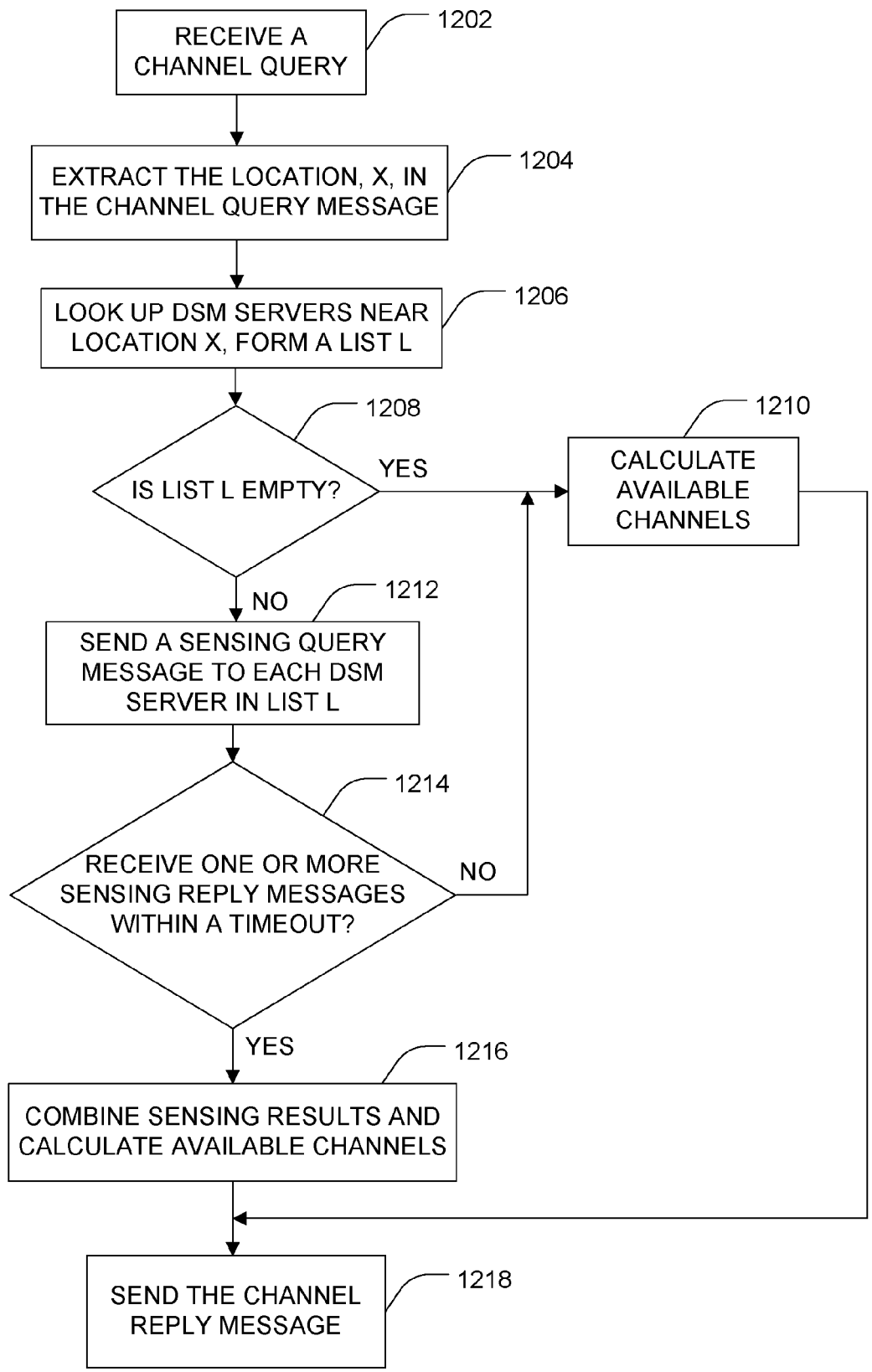
FIG. 12 shows a flow chart for a WSDB that gets reactive assistance from DSM servers for calculating available channels in accordance with one non-limiting embodiment.
Figure 13:
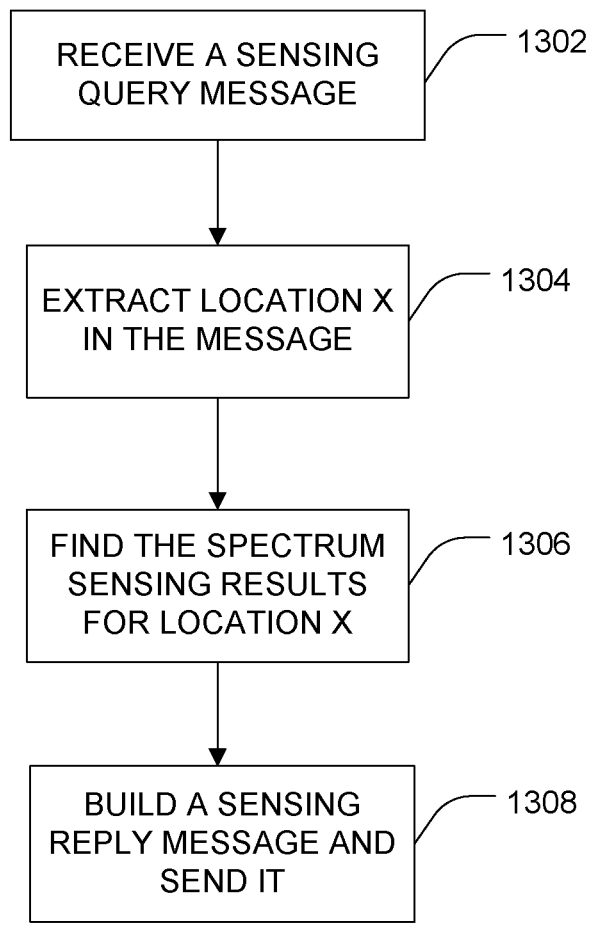
FIG. 13 shows a flow chart for a DSM server that reactively assists an available channel calculation in a WSDB in accordance with one non-limiting embodiment.

The flow charts for the WSDB and the DSM server in the reactive approach in accordance with various non-limiting embodiments are shown in FIG. 12 and FIG. 13, respectively. The process for the reactive approach may include, for example, upon the WSDB receiving a channel query message, it extracts the location information in the message, looks up DSM servers that cover that location, and sends a Sensing Query message to each of those DSM servers. Upon receiving the Sensing Query message, each DSM server sends back a Sensing Reply message to the WSDB, The WSDB may then combine the spectrum sensing results in the Sensing Reply messages, calculate the available channels, form a channel reply message and send it back to the sender of the channel query message.

Referring now to FIG. 12, at 1202, the WSDB receives a channel query. At 1204, the location (X) in the channel query message may be extracted. At, 1206, DSM servers near location (X) are identified to form a list (L). At 1208, it is determined if the list (L) is empty. If the list is empty, at 1210, available channels are calculated and a channel reply message is sent at 1218. If the list (L) is not empty, at 1212, a sensing query message is sent to each DSM server in the list (L). At 1214, it is determined if one or more sensing reply messages are received by the WSDB within a timeout period. If not, at 1210, available channels are calculated and a channel reply message is sent at 1218. If one or more sensing reply messages are received, the sensing results may be combined to calculate available channels at 1216. At 1218, a channel reply message is sent.

Referring now to FIG. 13, a DSM server receives a sensing query message at 1302 from a WSDB. At 1304, the location (X) may be extracted from the message. At 1306, the spectrum sensing results for location (X) are found. At 1308, a sensing reply message is built and sent to the WSDB, Dynamic Bandwidth Management Generally, each available TV channel in TVWS provides 6 MHz of spectrum capacity in North America that can be used for broadband connectivity. TVWS channels may vary based on geographical location. In Europe, for example, TVWS channels are typically 8 MHz wide. TVWS has relatively large coverage areas due to long range propagation of signal at these frequencies.

Where a frequency band may be used in one location, there may be large areas where this frequency is not used and available for use for wireless connectivity. The WSDB may keep track of all (or at least some of) the frequencies being used at different locations. Therefore, the WLAN APs have to register themselves with the TVWS database. The AP sends its location information to the database so it can receive the spectrum information where AP can operate. Non-registered WSDs are not allowed to operate in TVWS.

The central hub or the AP (referred to herein as a WSD-AP) is registered to the TVWS database. The registered WSD sends its location information to the database and receives a list of available channels from the TVWS database. The WSD-AP may communicate with the TVWS database or DSM server through the wired infrastructure using the TCP/IP internet stack. Alternatively, WSD-APs may communicate using wireless communications in the licensed spectrum. That is, the wireless infrastructure as described herein with respect to FIGS. 2A-2C may be used for inter-WSD-AP communications and for WSD-AP communication with WSDBs and DSM devices. The AP selects one of the available channels depending upon its capabilities and the capabilities of the WSDs it is managing. The network is then setup on the selected channel.

The way a channel is selected may lead to the wastage of bandwidth. One problem arises when a channel is chosen from a given bandwidth in such a way that the remaining bandwidth becomes unusable or is otherwise limited in its use due to fragmentation. Furthermore, WSDs operating in the same region will receive almost the same list of available/vacant channels. This may cause the WSDs to use the same channel and will lead to collisions and performance degradation.

In various embodiments, DSM system together with the WSDB can dynamically manage the use of the various bands within the white space spectrum. For example, the systems and methods described herein may seek to reduce, or in some cases eliminate, unusable fragments in the white space spectrum. In some embodiments, once it is determined the spectrum is being wasted (i.e., an inefficient use of bandwidth is detected) various devices may be instructed to appropriately switch the channels to correct the problem.

Figure 14:
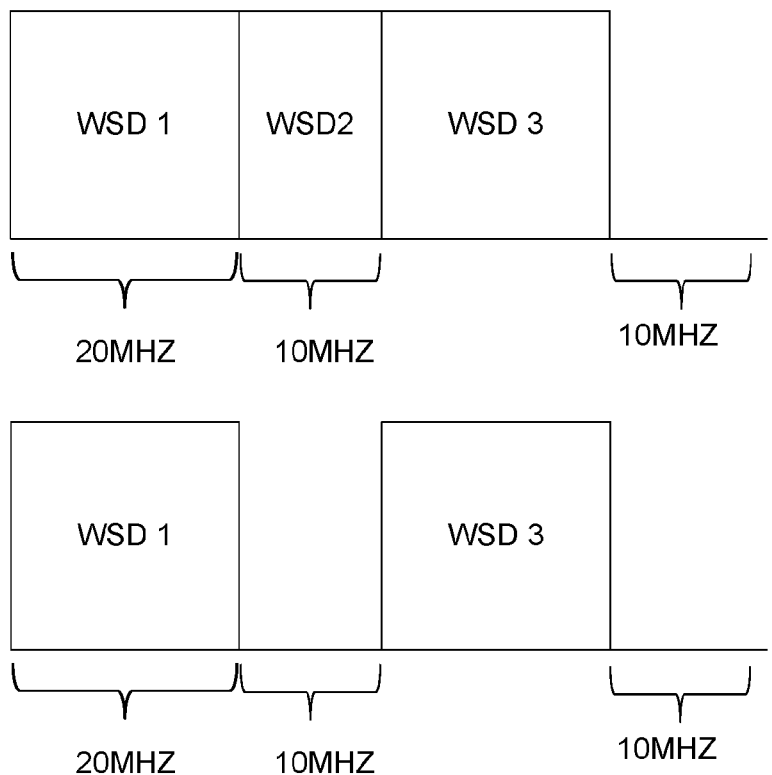
FIG. 14 shows a conventional bandwidth inefficiency problem.

For example, by observing the spectrum maps shown in FIG. 14, it can be seen that when WSD2 leaves the network, it creates two 10 MHz fragments. If another device, such as an access point (AP), wants to create its network on a 20 MHz bandwidth, it will not be able to that since there is no continuous/contiguous 20 MHz of spectrum available. As described in more detail below, in accordance with the systems and methods described herein, WSD3 may be moved right next to WSD1 to create a 20 MHz of continuous spectrum. Moreover, WSD3 could be moved to some other part of the spectrum in order to generate increased continuous spectrum.

Figure 15:
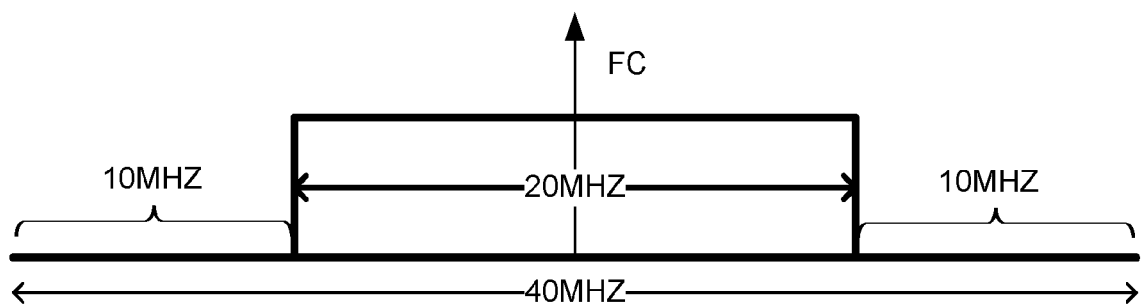
FIG. 15 shows a conventional 40 MHz bandwidth allocation, whereby a WSD operating on a 20 MHz channel selects the center of the 20 MHz bandwidth as the center frequency, and the remaining parts of the spectrum are two 110 MHz channel blocks on each side.

FIG. 15 illustrates an example of a problematic allocation of bandwidth for a WSD. Assuming the WSD is allocated to 40 MHz of bandwidth and operates on a 20 MHz channel, the center of the given bandwidth is selected as the center frequency. As shown in FIG. 15, the remaining parts of the spectrum are two 10 MHz channel blocks on each side. Thus, if another WSD which operates on 20 MHz channel in the same location is given the same available spectrum, it would not be able to select a 20 MHz channel without colliding with the already established communication. While it is appreciated that the two WSDs could share the same channel through carrier sense multiple access (CSMA), or some other medium sharing technique, such functionality may reduce throughput.

Figure 16:
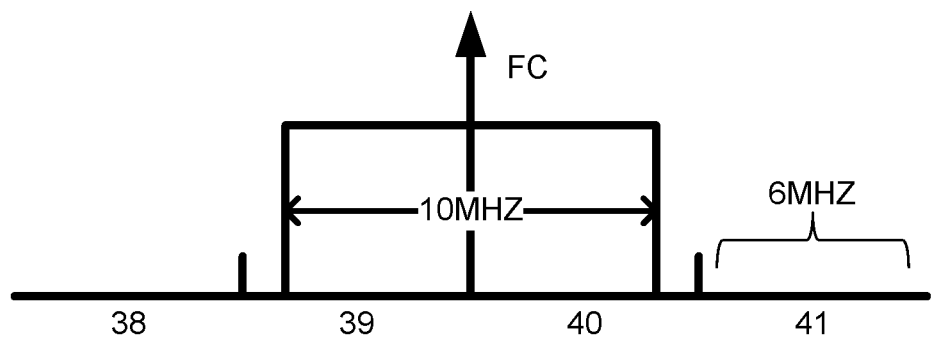
FIG. 16 shows four available conventional channels, (e.g., channels 38-41), whereby a WSD operates on a 10 MHz channel, so that the WSD selects the center of the given band as the center frequency, and the available space left in the band is channel 38 and channel 41, (i.e., 6 MHz on each side)

FIG. 16 shows a similar problem associated with the utilization of TVWS. While it may vary based on jurisdiction, in the United States there is 6 MHz spacing between adjacent TV channels, as shown in FIG. 16. In the illustrated example, a WSD is given a list of four available channels, (e.g., channels 38-41). Suppose the WSD operates on 10 MHz channel so that it selects the center of the given band as the center frequency. As shown in FIG. 16, the available space left in the band is channel 38 and channel 41, (i.e., 6 MHz on each side). If another WSD in the same locality operating on 10 MHz channel is given the same list of channels, the WSD will encounter the problem similar to the one illustrated by FIG. 15. This problem may be referred to as "channel packing".

In accordance with the systems and methods described herein, the problem described above can be resolved if the center frequency for the WSD is selected as far as possible from the center of the given band. As disclosed herein, the channel is selected by any suitable device, such as an AP, a DSM, or a WSD, for example. However, one of ordinary skill in the art would appreciate that there may be other network managers, (e.g., cellular base stations, Node-Bs and IEEE 802.16 base stations, and the like), which may implement the systems and methods described herein to select a channel in TVWS.

Figure 17:
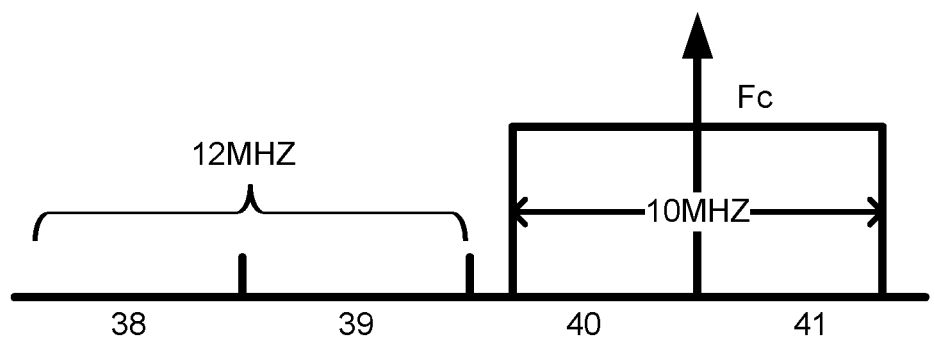
FIGS. 17 and 18 show that a WSD may either select the boundary of channel 38 and channel 39 as the center frequency, or the boundary of channel 40 and channel 41 as the center frequency, which may be selected as the center frequency for a 10 MHz channel.
Figure 18:
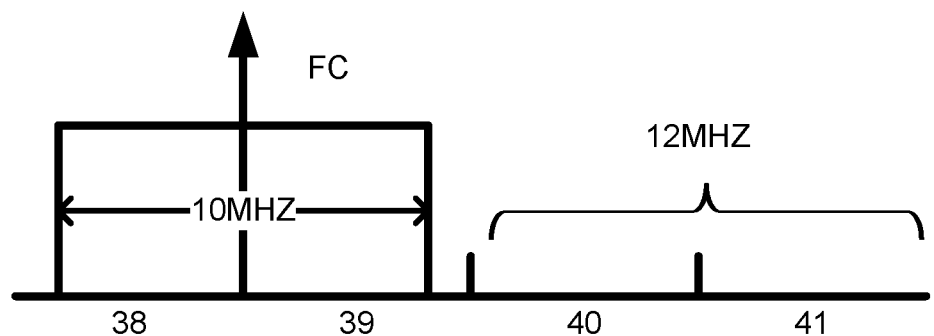

If this solution is applied to the problem described in FIG. 16, then the WSD may either select the boundary of channel 38 and channel 39 as the center frequency, or the boundary of channel 40 and channel 41 as the center frequency, as shown in FIGS. 17 and 18, respectively.

FIGS. 17 and 18 illustrate the scenario where the center frequency is selected as far as possible from the center of the given band. This spectral placement provides an opportunity to other APs in the area with the same list of channels to select another 10 MHz channel without a collision.

The channel selection rules described herein are not necessarily the only criteria for channel selection. Other factors, such as interference mitigation, bandwidth aggregation and network management, for example, may also be considered. Furthermore, as described above, when identifying preferred frequency ranges, the DSM or WSD-AP may select frequency ranges or channels in a manner that preserves larger contiguous blocks of unused spectrum so that other channel queries that request larger blocks of spectrum may be serviced. That is, if the selection of one channel tends to preserve a block of contiguous spectrum, while the selection, of another channel tends to segment the remaining available spectrum, then the first channel is preferred. Alternatively, the preservation of contiguous spectrum may be performed based on geographic regions. That is, the preservation of contiguous spectrum blocks in a first geographic region may be prioritized over other regions such that channel selection that results in spectrum fragmentation in one region may still be preferred due to the preservation of a contiguous block in an adjacent or overlapping region that is deemed to have priority. Contiguous spectrum prioritization may also be based on usage statistics such that areas with more frequent high-bandwidth requests are prioritized over other regions. Thus, there may be different factors or scenarios which may help the WSD choose either of the center frequency shown in FIG. 17, or the center frequency shown in FIG. 18, as described in more detail below.

In one embodiment, the TVWS database is a passive database that does not receive any feedback from the WSD after a list of channels is sent to the WSD. Thus, the TVWS database is unaware of the channel being used by the WSD. In such implementations, the WSD may have to sense all possibilities and select the channel which is vacant. With reference to FIG. 18, for example, if the WSD senses a WSD operating on channel 38 and channel 39, then the boundary of channel 40 and channel 41 may be selected as the center frequency for a 10 MHz channel. On the other hand, if all, the channels are available, the WSD may randomly choose anyone of the channels.

In one embodiment, the TVWS database is an active database that receives feedback about selected channels. The feedback may be sent to the TVWS database by the WSD, for example. In this implementation, the problem illustrated in FIG. 16 does not arise because when another WSD asks for the list of channels, the channel used by the other WSD (i.e., the WSD illustrated in FIG. 16) would not be sent by the TVWS database. However, if two WSDs request the list of channels at the same time, or the same list of channels is sent to two or more WSDs before receiving any feedback from any of the WSD, the channel selection problem may occur. To avoid this issue, the WSD may go into a random backoff mode before starting to transmit on one of the channels from the TVWS list. After the back off mode expires, the WSD may sense the channel for some time. If the channel is vacant, the WSD may reserve that channel from the list. The other WSD following the same procedure may then use the other channel, if available, on the other side of the assigned spectrum. This type of problem occurs when two or more WSDs are biased towards one side of the available spectrum. There may be different reasons for this biasing, including but not limited to: transmit power constraint, transmit mask, adjacent channel reserve for safety purposes, range, and the like.

The term "active database" may also refer to any system, e.g., an IEEE 802.19.1 coexistence system, which tries to manage one or more networks operating in TVWS, and which may rely on information provided by the TVWS database.

A forced channel switch procedure may be applied when a WSD or a group of WSDs operating under an AP already occupy a channel, as shown in FIG. 15, (referred hereinafter as the incumbent WSD). In this case, there are two 10 MHz vacant holes on each side which waste 20 MHz of useful spectrum. In some embodiments, when another WSD is allocated in the same spectrum by the TVWS database, the WSD will attempt to setup a network on the channel as far as possible from the spectrum. In this scenario, as illustrated in FIG. 15, when it tries to establish the network on either end of the spectrum it will be blocked by the incumbent WSD using the spectrum in the center. The new WSD therefore would be able to asses that a bandwidth of 20 MHz in the center is being used, whereas there are two 10 MHz blocks available at the end. In some embodiments, this assessment may lead to the initiation, of a forced channel switch by the new WSD. The already established network (e.g., the incumbent WSD) may be coerced to switch its operating channel using the following methods.

In case of an active database, the new WSD may seek the database's assistance to move the incumbent WSD to a new channel. The new WSD may send feedback to the database with its findings about the spectrum usage. Referring to FIG. 15, the database may then use its logic to assign the incumbent WSD either the first 20 MHz of the spectrum or the last 20 MHz of the spectrum. The remaining bandwidth could then be assigned to the new WSD.

In some embodiments, the new WSD directly communicates with the incumbent WSD through a high priority signaling. The new WSD may transmit a request message informing the incumbent WSD about the new center frequency it should move to, or it may send to the incumbent WSD a list of possible center frequencies. Optionally, the incumbent WSD may be requested to send a confirmation message once the channel switch to the new frequency is completed. In some embodiments, the incumbent WSD has to switch the channel within a predetermined time period as determined by a timer. After the new WSD receives the confirmation message or the timer expires, it may start operating in the new available spectrum (e.g., 20 MHz in FIG. 15). In order to avoid collisions, the new WSD may monitor or sense the usage of the assumed to be now vacant channel before operating in the new available spectrum. In various embodiments, communications between different APs may be directed through a coexistence system.

An AP operating in accordance of the systems and methods described herein may regularly scan the adjacent frequencies to check if the adjacent channels have been vacated if the channel right next to the AP is vacated, the AP may be operating in the middle of the spectrum resulting in inefficient bandwidth management. In this case, once an AP becomes aware of this situation through a proactive adjacent channel scan, the AP may attempt to move its network to a new channel as far as possible center of the new available spectrum. This may be achieved, for example, by sending a switching request to an active database and receiving confirmation before switching to the new channel, or switching the network to the new channel and then sending an information message to a passive database.

Figure 19:
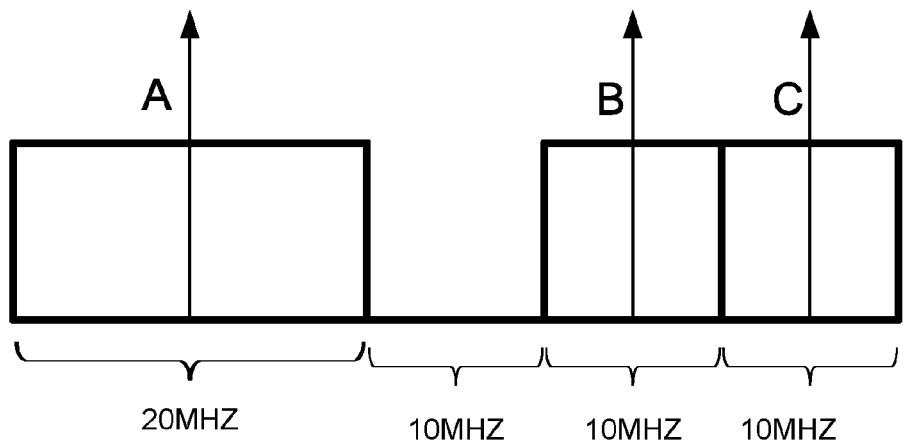
FIG. 19 shows a spectrum in which three different networks operate. Network A operating on a 20 MHz channel is occupying the first 20 MHz of the spectrum, Network C is operating on the last 10 MHz of the spectrum, whereas network B is occupying 10 MHz adjacent to network C.

FIG. 19 illustrates three networks operating in a given spectrum. Network A is operating on a 20 MHz channel and occupies the first 20 MHz of the spectrum. Network C is operating on the last 10 MHz of the spectrum and network B is occupying 10 MHz adjacent to network C. If the channel occupied by network C becomes vacant for some reason, network B would be in the middle of the new spectrum. Through proactive channel scanning, the AP in network B would become aware that it is the middle of the 30 MHz spectrum. The AP may then initiate the channel switch procedure to switch to the either side of the spectrum. By switching network B's channel, a 20 MHz of continuous spectrum will be opened for some other network to use.

In some cases, the networks may not be able to move to the edge of the spectrum. This limitation may be due to various regulatory reasons and/or transmit power constraints (e.g., a network operating with high transmit power cannot operate adjacent to a TV broadcast signal as specified by FCC requirements). High transmit power networks normally leave some gap between the TV broadcast channel and its operating channel to meet the regulatory requirement. This vacant space in the spectrum may cause the "channel packing" problem previously described.

Figure 20:
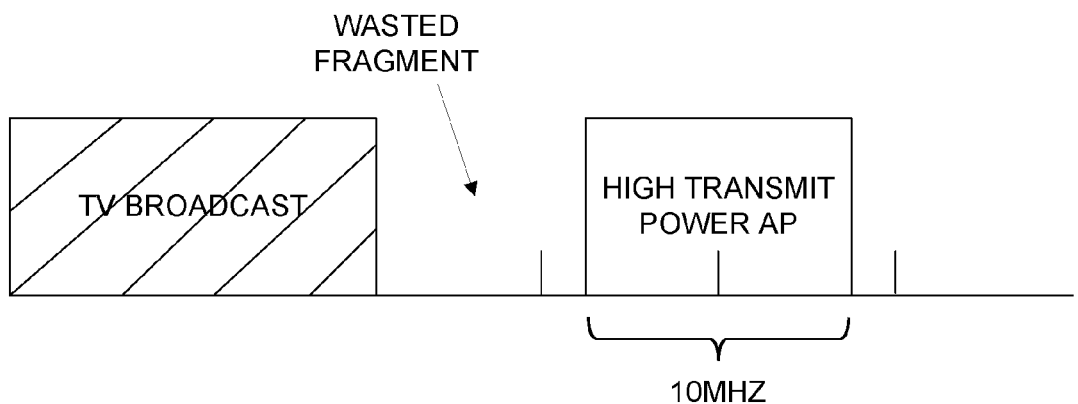
FIG. 20 shows that a "wasted fragment" between a TV broadcast and the AP.

FIG. 20 illustrates a "wasted fragment" between a TV broadcast and a "high transmit power" AP. If another AP, which meets the transmit power requirement for operating adjacent to TV broadcast, requires 10 MHz bandwidth, it would not be able to operate in the spectrum as shown in FIG. 20 unless it makes the "high transmit power" AP move its center frequency to create enough spectrum for the new "low transmit power AP". The channel change for the incumbent AP may be performed, depending on the type of the TVWS database (passive or active, for example) the AP is connected to, as previously described. In some embodiments, high priority signaling (or some coexistence system) may be used to notify the other APs that a low power network is present and requesting spectrum. The signaling channel (or coexistence system) may then be used to coordinate the channel change of the "high transmit power" AP to free up the bandwidth for the "low transmit power AP".

Figure 21:
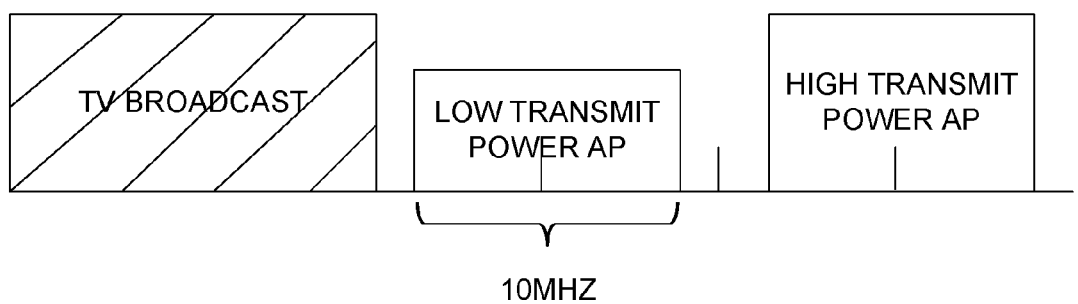
FIG. 21 shows what happens when a "high transmit power" AP selects the initial operating channel, whereby the AP should have setup its network after leaving a gap of two TV channels.

Depending on the method used to select the initial operating channel for the "high transmit power" AP, this situation may be avoided. For example, in accordance with the present disclosure, the "high transmit power" AP should have set up its network to leave a sufficient gape (e.g., a gap of two TV channels), as shown in FIG. 21, Therefore, in accordance with the systems and methods described herein, an AP which cannot operate adjacent to a TV broadcast should try to set up its network after leaving enough space (e.g., 2, 3 or 4 TV channels) so that one or more low transmit powered APs are able to establish their networks in that vacant space. Similarly, when a DSM system is used to assign the AP to particular channels, the DSM system should allocate the AP to a portion of the bandwidth that reduces fragmentation.

In some situations, all available TV channels may be occupied by different networks. In the case of a passive database, the list of available TVWS channels (channels not used by a TV broadcast, for example) may be provided to the AP by the passive database. Since there is no feedback to the passive database, the database would not know that the channels are occupied by various networks. When the AP determines that all of the channels are occupied (through sensing or some other coexistence technique, for example, the AP may request one or more APs to reduce their operating bandwidth. The new AP may send a bandwidth reduction request message to different APs via a direct AP-to-AP communication, or, if applicable, through some coexistence system. This request message may contain, for example, an identification (ID) of the requesting AP, the channel number, the requested bandwidth, the required time for the requested bandwidth, location, and so forth. The requesting AP would then wait for bandwidth reduction replies from the requested APs. The reply message may contain, for example, a response (accepted, denied), an ID of the AP, a channel number, the bandwidth assigned, a time for the assigned bandwidth, a time period, after which the bandwidth would be available, a location, and so forth.

When the requesting AP receives an "accepted" response message from the other AP, the requesting AP sets up its network according to the information provided in the response message, and then it may send a confirmation to the requested AP.

In some embodiments, the AP may be assigned a bandwidth less than the requested bandwidth. In this case, the AP may query other APs or choose to accept the given bandwidth. Also, the requesting AP may be allotted the bandwidth for a specified amount of time.

Figure 22:
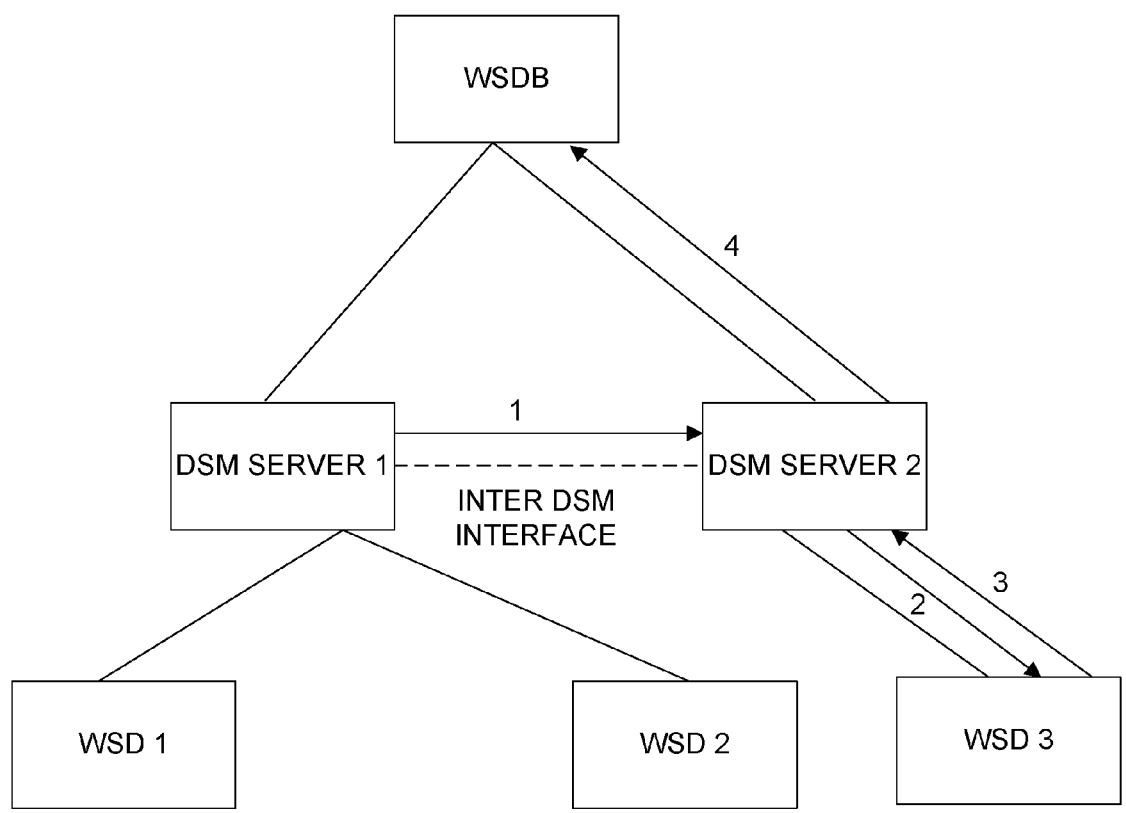
FIG. 22 shows dynamic bandwidth management using an inter-DSM interface in accordance with one non-limiting embodiment.

In case of an active database, the AP may send a channel query message to the database. The database may then send a bandwidth reduction request to one or more different APs and receive the response. Once the database receives the response from the APs, it sends the allocated, channel information to the requesting AP. If the database receives more than one "accepted" response, it may choose one (or more) of the APs and request it to reduce its operating bandwidth, depending on different factors, such as regulatory requirements, bandwidth provided, time availability, and/or type of traffic, for example. In some embodiments "inter-DSM" and "inter-WSD" interfaces may be used to notify other DSM servers if there is a fragmented spectrum, as shown in FIG. 22. The DSM server that can resolve the issue may then take corrective action and resolve the issue.

With reference now to FIG. 22, when WSD 2 leaves the network it creates a 10 MHz fragment (as illustrated in FIG. 19). The DSM server 1 may be configured to notice this fragment and inform other DSM servers via message 1 (i.e., a fragment/wastage indication). When DSM server 2 receives this indication, it may be configured to resolve the situation by moving WSD 3 to a new frequency. The DSM server would send a channel free-up request (message 2) to WSD 3 and, if the request is accepted, WSD3 would send a channel change response (message 3). In some embodiments, the DSM server 2 indicates this change to WSDB via message 4.

Figure 22A:
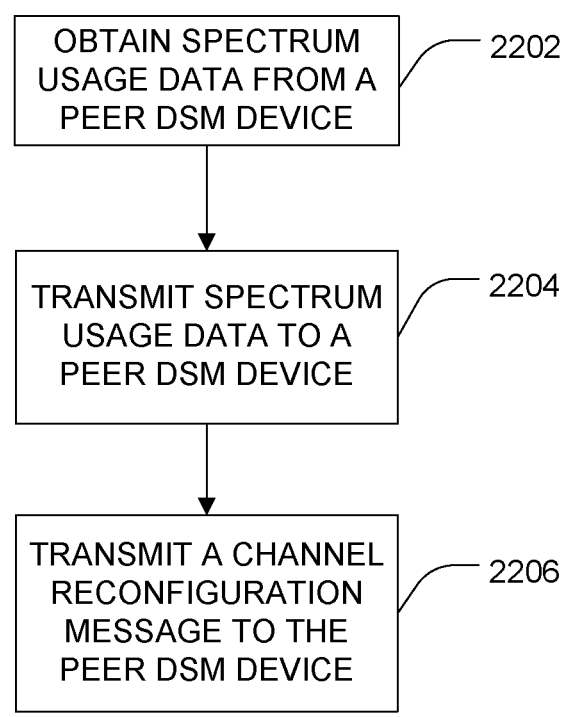
FIG. 22A shows a flow chart to prevent, or at least reducing spectrum fragmentation in accordance with one non-limiting embodiment.

FIG. 22A is a flow chart illustrating a technique for a DSM to prevent, or at least reducing spectrum fragmentation in accordance with one non-limiting embodiment, At 2202, spectrum usage data is obtained from a peer DSM device for WSD-APs managed by the peer DSM device (such as WSD 3 in FIG. 22). At 2204, spectrum usage data is transmitted to the peer DSM device for locally-managed WSD-APs. At 2206, a channel reconfiguration message is transmitted to the peer DSM device to alter the spectrum used by at least one WSD-AP managed by the peer DSM device. In some embodiments, the spectrum usage data may include WSD-AP location information, power level information, radio access technology information, and/or WSD-AP identification information, for example.

Figure 23:
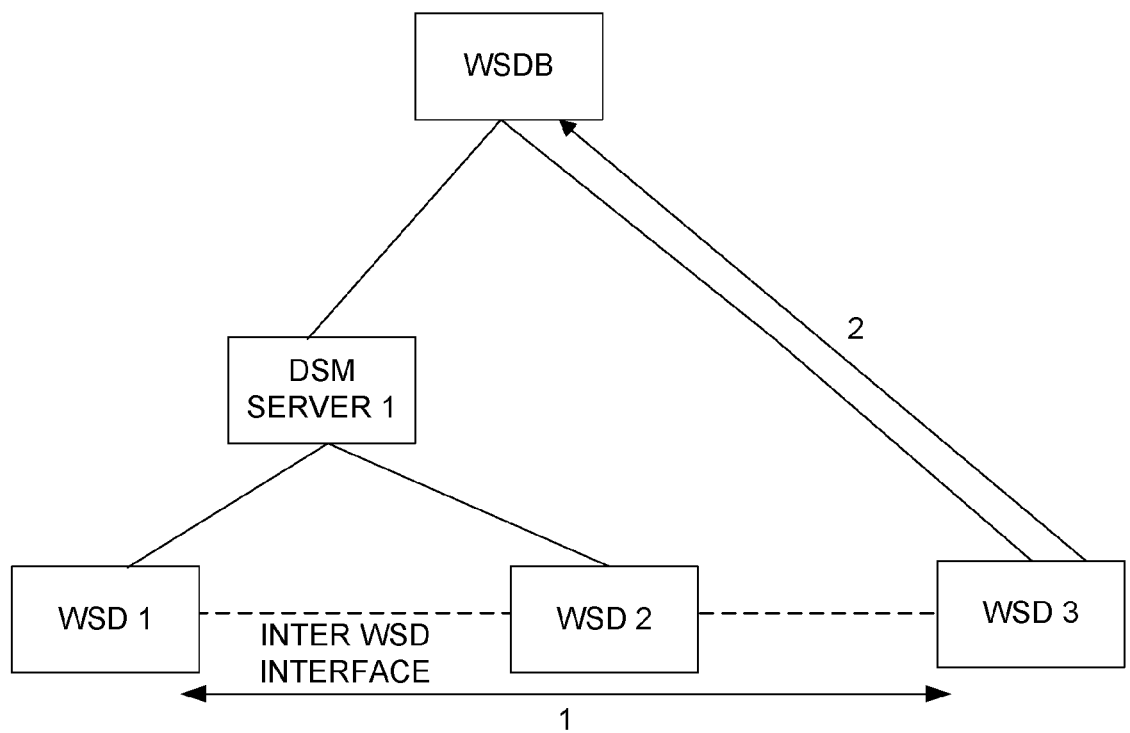
FIG. 23 shows dynamic bandwidth management using an inter-WSD interface in accordance with one non-limiting embodiment.

In some embodiments, dynamic bandwidth management can also be performed via an "inter-WSD" interface. FIG. 23 illustrates an "inter-WSD" interface that addresses the issues depicted in FIG. 21. When WSD 2 leaves the network, WSD 11 and WSD 3 receive an indication through an "inter-WSD" interface (message 1). In some embodiments, this indication can be sent proactively by WSD 2 (prior to it leaving the network) to both WSD 1 and WSD 3. In some embodiments, WSD 1 and WSD 3 monitor the "Inter-WSD" interface for a WSD 2 "heartbeat". This heartbeat signal can be carried, for example, in a periodic channel usage message. An absence of this heartbeat (based on some timeout value, for example) would indicate that WSD 2 has left the network. The heartbeat can be implemented as some form of broadcast signal (e.g. AP beacon). Once WSD 1 and WSD 3 receive the indication, they may check if they can resolve the problem. In this case WSD 3 would be able to solve the issue by switching its operating frequency. WSD 3 would then change its center frequency and optionally send an indication to WSDB (message 2). Note that in some embodiments, WSD 1 and WSD 3 may use the "Inter-WSD" interface to negotiate a mutually agreeable solution (for instance there may be cases where it would be advantageous to change the operating frequency of WSD 1 or for both WSD 1 and WSD 3 to change operating frequencies).

In some embodiments, this mechanism can be extended by giving the WSDs and DSM servers the ability to subscribe to the broadcast channel usage information (e.g., using a channel usage subscription request message).

FIG. 23A is a flow chart illustrating a technique for preventing, or at least reducing spectrum fragmentation, in accordance with one non-limiting embodiment. At W1, a fragmented spectrum utilization is identified. At W2, the access point interdependency information is analyzed. At W3, a contiguous block of available spectrum is configured. The contiguous block may be configured by transmitting a channel reconfiguration message to a whitespace access point device, for example.

In some embodiments, fragmented spectrum utilization is identified by a DSM server. The DSM server may determine that fragmented spectrum utilization, is present by one or more techniques, such as in response to spectrum measurements, or alternatively due to deactivation of a WSD-AP, such as by messaging with a WSD-AP including a deregistration message from the WSD-AP, or failure to receive one or more WSD-AP heartbeat messages. In some cases, the DSM server may informed by a peer DSM that a WSD-AP being managed by that peer DSM has deactivated or deregistered.

In some embodiments, fragmented spectrum utilization is identified by a WSD-AP. A WSD-AP may determine, for example, that fragmented spectrum utilization, is present in response to spectrum measurements. The WSD-AP may scan the relevant spectrum to identify other peer WSD-APs and obtain WSD-AP identification information, such as an SSID, Cell ID, or other identification parameter of its peer. The WSD-AP may communicate this information to a DSM device, or may communicate directly with the peer WSD-AP. In embodiments where the peer WSDs communicate with each other, the WSD-AP may use the identification information to query a WSD registration database to obtain an address of the peer WSD-AP, such as an IP address. Alternatively, the WSD-AP may use peer discovery techniques in order to establish communication. The WSD-AP may then communicate with the peer WSD-AP to negotiate a channel reconfiguration.

In some embodiments, analyzing access point interdependency information may comprise obtaining WSD-AP frequency usage data from WSD-APs within a region and identifying a movable channel that is non-adjacent to other presently-utilized channels. A movable channel may be a channel, that may be moved to a new channel that is adjacent to presently-utilized channels, and the new channel is one that does not conflict with other WSD-APs within the region.

In some embodiments, configuring a contiguous block of available spectrum by transmitting a channel reconfiguration message to a whitespace access point device is performed by a WSD-AP. In other embodiments, configuring a contiguous block of available spectrum by transmitting a channel reconfiguration message to a whitespace access point device is performed by a DSM device. The channel reconfiguration message may include parameters indicating a desired channel or frequency range that the WSD-AP should move to. The message may also include a desired power level and, other parameters such as a particular radio access technology to use, for example.

The content of the messages in accordance with various embodiments that enable the above-described functionality are described below.

Registration Message and Registration Success Confirmation Message

In some embodiments, fixed WSDs must register with the WSDBs and the registration message may include the following information:

WSD FCCID: the FCC ID of the WSD;
WSD Serial number: the manufacturers serial number of the WSD;
WSD location; the location of the WSD, which is expressed in the latitude longitude format;
WSD owner: the name of the person or business who owns the WSD;
WSD contact: the name of the contact person responsible for the WSD;
WSD contact address: the address of the contact person;
WSD phone number: the phone number of the contact person; and
WSD contact email address: the email address of the contact person.

When the registration message is received by a WSDB, the WSDB may send back a "Registration Success Confirmation" message, which may includes the ID information of the WSD.

Re-registration Message and Re-registration success Confirmation Message

A registration by a WSD may be valid for a particular time period, such as three months. When the registration expires, a WSD may be required to re-register. The content of a re-registration message may be the same as the registration message. In addition, if a WSD has moved to a new location, the WSD needs to re-register with the WSDB. When the Re-registration message is received by a WSDB, the WSDB may send back a "Re-registration. Success Confirmation" message, which may include, for example, the ID information of the WSD.

De-registration Message and De-registration Success Confirmation. Message

In some embodiments, if a WSD will be turned off, the WSD needs to de-register so that the relevant WSDBs can remove the registration information. If a WSD has moved to a new location, the WSD may also need to de-register with the WSDB to remove obsolete information. The de-registration message may contain all the information in a Registration message, plus information that the message is for de-registration.

When the De-registration message is received by a WSDB, the WSDB may send back a De-registration Success Confirmation message, which may include the ID information of the WSD.

Channel Query Message

The channel query message may have one or more of the following information fields:

WSD FCCID: the FCC ID of the WSD;
WSD Serial Number: the manufacturers serial number of the WSD;
WSD location: the location of the WSD, which is expressed in the latitude-longitude format;
WSD mode: the mode of the WSD, and it could be Mode I, Mode II, and Fixed;
Antenna height: the height of antenna above the ground level;
Time stamp: which records the time at which the message was sent;
WSD owner: the name of the person or business who owns the WSD;
WSD contact: the name of the contact person responsible for the WSD; person; and WSD contact address: the address of the contact person;

WSD phone number: the phone number of the contact

WSD contact email address (optional): the email address of the contact person.

In addition, to support the local handling of channel queries and a search extension, the channel query message may contain the following information:

Destination of this message (e.g., a DSM server or WSDB).

Address of the DSM server (conditional): If this message will be sent by a DSM server, the address of the DSM server may be put in the message so that the WSDB knows where to send the channel reply message. Otherwise, this information will not be included. The address of the DSM server could be interpreted as the a "coexistence ID".

Address of the WSDB (conditional): If this message will be sent by a WSDB for performing search extension, the address of the WSDB may be put in the message so that the DSM server knows where to send the channel reply message. Otherwise, this information will not be included.

List of channels for which the information is requested. That is, the query may ask for information only for a specific list of channels.

Channel Reply Message

The channel reply message may contain the following information:

Available channel list: the list of available channels for the requesting WSD;

Expiration times: specifies the expiration times for the availability of the channels in the available channel list described above;

Transmission powers: the maximum transmission power for each channel in the available channel list; and Address of the WSD: the address of the WSD that the channel reply message is for.

Address of the DSM server (conditional): If the corresponding channel query message was sent by a DSM server, the WSDB may specify the address of the DSM server so that the channel reply message can reach the DSM server. Otherwise, this information is not included.

Address of the WSDB (conditional): If the corresponding channel query message was sent by a WSDB (for search extension), the DSM server may specify the address of the WSDB so that the channel reply message can reach the WSDB, Otherwise, this information is not included.

Channel Usage Measurement Report

The purpose of this message is to broadcast channel usage (e.g., to a list of subscribers). This message may also be used to respond to a channel query message, providing more information than a channel reply message. In some embodiment, this message is the message that is used to communicate on the "inter-DSM" or "inter-WSD" link. It provides an indication that is the WSD is now using, or freeing up a channel. The message can be both periodic/regular or event-triggered. The following information may be contained in this message:

Location(s) for which information is provided;

List of channels for which information is provided;

Time stamp; and

Power the network is using (40 mW max, 50 mW max, 100 mW max, 4 W max, etc.).

Channel state. For each channel indicate if known/believed to be occupied by:

Primary via regulatory database;

Primary based on measurement reports;

unknown);

C) Known unlicensed users, including operating class (max power or

D) High interference of unknown source; and

E) Free-up.

The channel state may be obtained by any of the following means:

Sensing measurements;

Reports from other CMs; and

Channels actually used by the network/device itself.

Channel Usage Subscription Request.

This message may allow a DSM server to subscribe to periodic or regular channel usage information. This can be used for the "Inter-WSD" interface. The following information may be contained in this message:

Address of the DSM server, which could be its "coexistence ID";

Time stamp; and

Optional subscription duration.

Channel Free-up Message

The channel free-up (or channel reconfiguration) message may be used to request particular channels to be freed up. The issuing entity should strive to make the request reasonable, and it cannot necessarily assume request will be honored. Use of this message is one embodiment of configuring a contiguous block of available spectrum by transmitting a channel reconfiguration message to a whitespace access point device. Information carried in the message may include:

Address of the issuing DSM server, which could be its "Coexistence ID";

List of channels to which request applies;

Reason for request (seek contiguous BW; would like to use these channels because of max power concerns; other);

Location;

Time Stamp; and

Bandwidth Wastage Indication.

The bandwidth wastage indication message may notify the WSDs about the fragmentation in the spectrum. This is one way in which devices may identify fragmented spectrum utilization. It may contain the following information:

Frequency where fragmentation is occurring;

Reason for fragmentation;

Timestamp; and

Corrective action and WSD ID which can perform the correction (optional).

Sensing Report Message

The sensing report message may support the function of proactively assisting the calculation of available channels in the WSDBs. It is one embodiment of providing supplemental spectrum usage data. It may include the following information:

ID of the sender that identifies which WSD sends this message;

Address of the WSDB that specifies the address of the WSDB which will receive this message; and Spectrum Sensing Table that describes the spectrum sensing results indexed by channel number and location. Actively allocated channels may be indicated as not available.

Sensing Update Message

The sensing update message may support the function of proactively assisting the calculation of available channels in the WSDBs. It is different from the sensing report message, which reports the sensing results for all channels whereas a sensing update message may send sensing results only for those channels that have had undergone changes since the last update. It is another embodiment of providing supplemental spectrum usage data. A sensing update message may include the following information:

ID of the sender that identifies which WSD sends this message:

Address of the WSDB that specifies the address of the WSDB which will receive this message; and Spectrum Sensing Update Table that describes the spectrum sensing results that need to be updated indexed by channel number and location.

Sensing Query Message

The sensing query message may support the function of reactively assisting the calculation of available channels in the WSDBs. It is a further embodiment of providing or obtaining supplemental spectrum usage data. It may include the following information:

ID of the sender that identifies which WSDB sends this message;

2 Address of the DSM server that specifies the address of the DSM server which will receive this message:

3) Interested Spectrum List that lists the spectrum that the WSDB is interested to know as well as the associated locations; and 4) Latency that specifies within what time the sensing results must be generated. This helps the receiver of this message to determine what sensing algorithms should be used, since different sensing algorithms need different amount of processing time.

Sensing Reply Message

The sensing reply message may support the function of reactively assisting the calculation of available channels in the WSDBs. It is a further embodiment of providing supplemental spectrum usage data. It may include the following information:

ID of the sender that identifies which DSM server sends this message;

Address of the WSDB that specifies the address of the WSDB which will receive this message; and Spectrum Sensing Table that describes the spectrum sensing results indexed by interested channel number and location. Actively allocated channels will be indicated as not available.

Some of the possible mappings between the DSM system and the 802.19.1 system architectures are described below.

Figure 24:
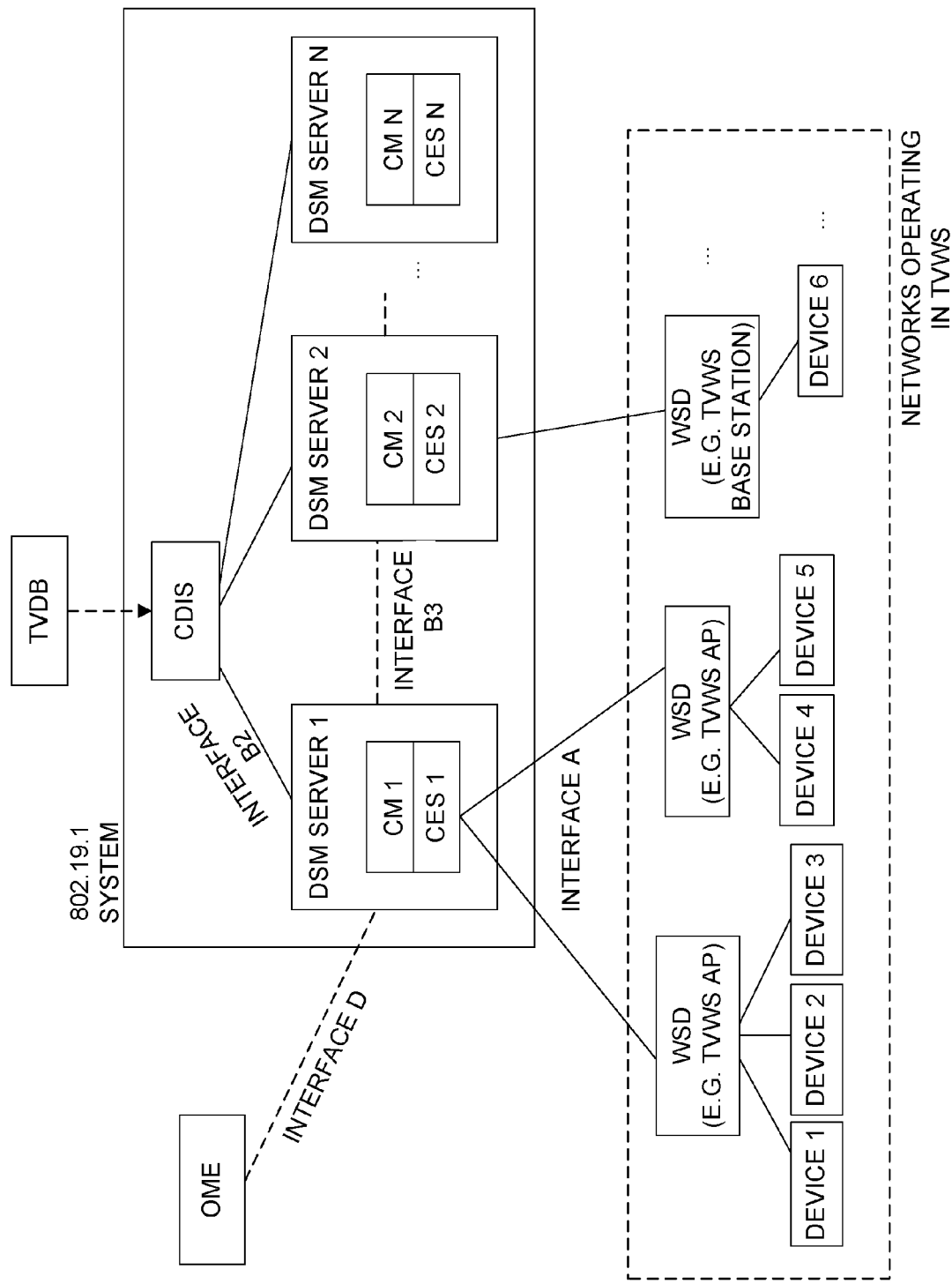
FIGS. 24-26 show various mappings of a DSM system to an IEEE 802.19.1 system architecture.
Figure 25:
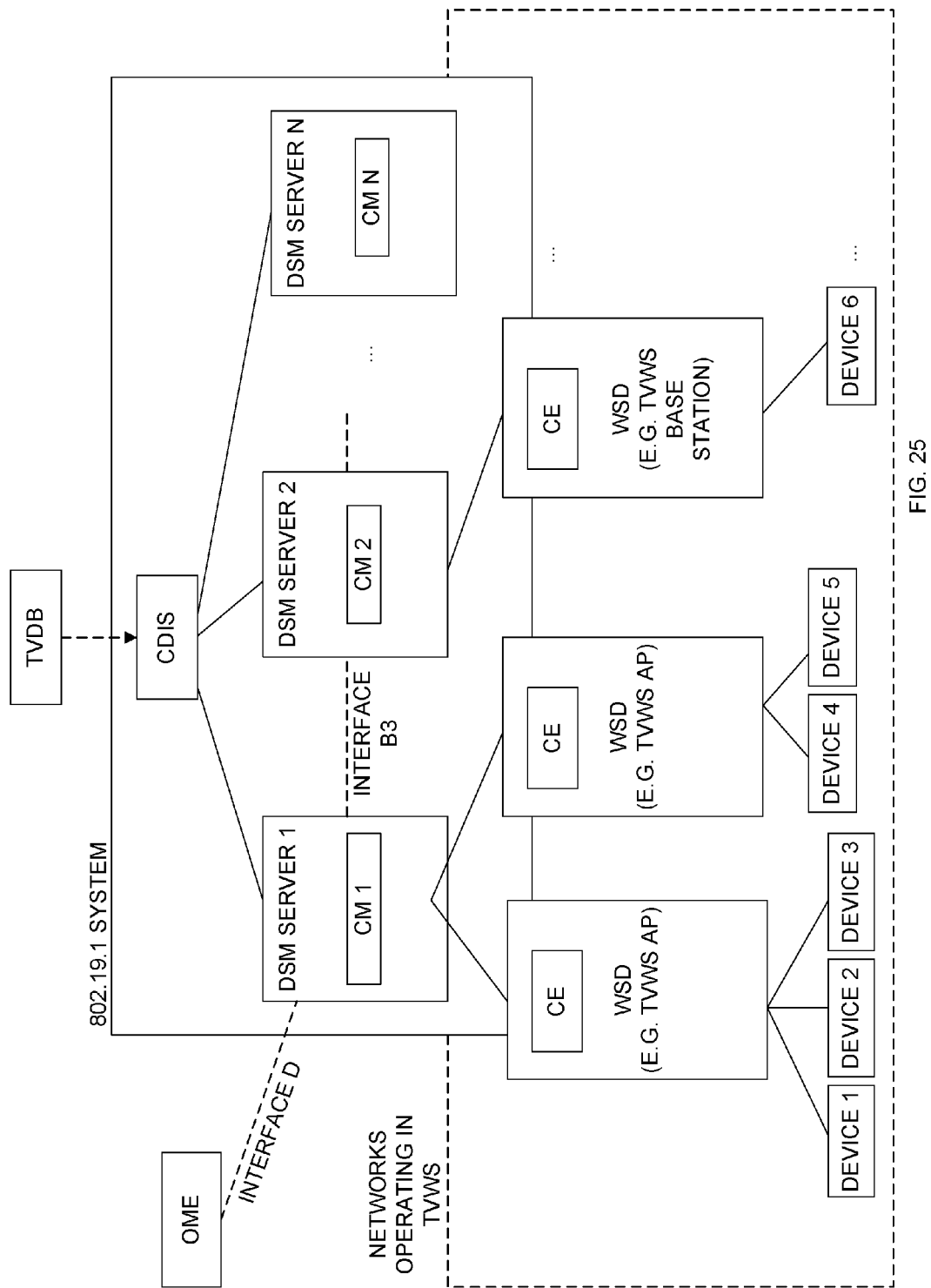
Figure 26:
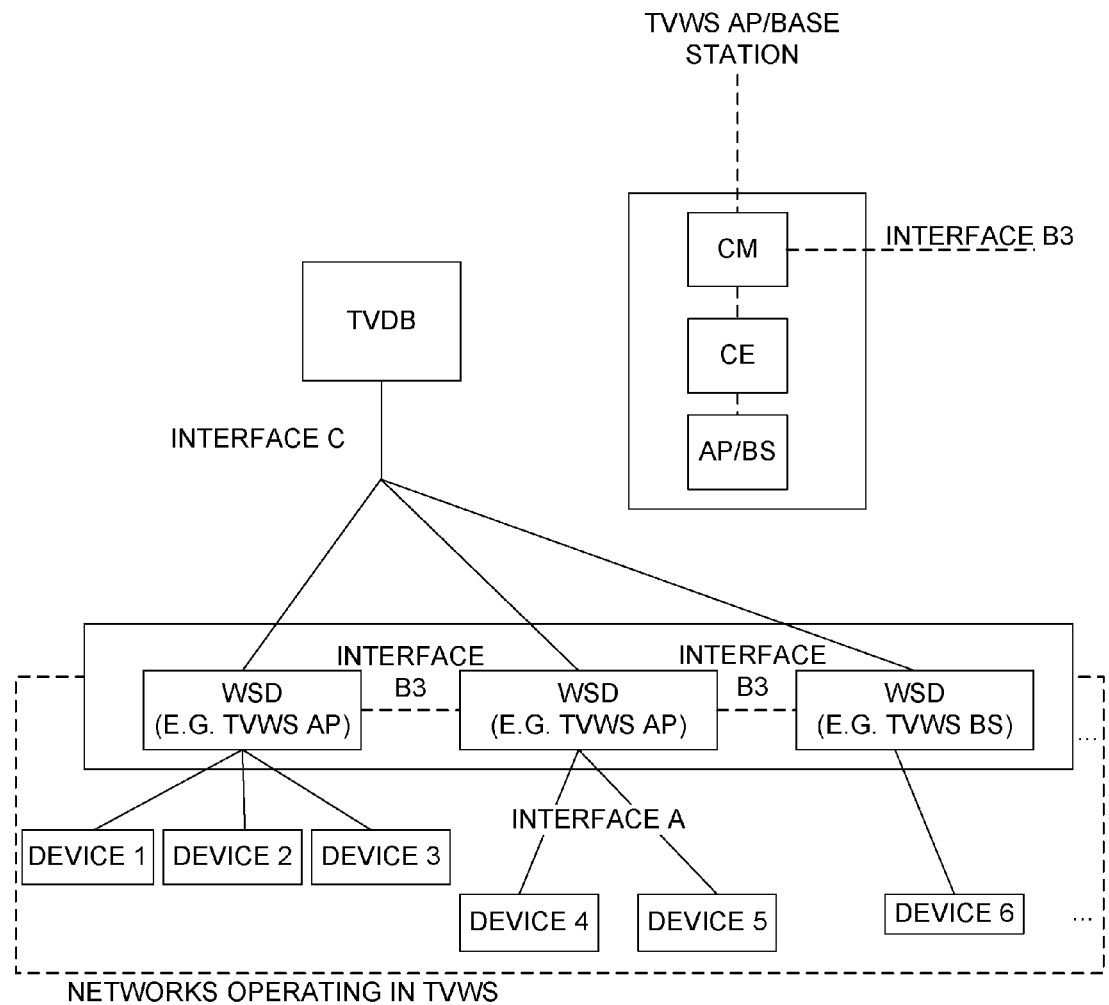

FIGS. 24-26 show various mappings of a DSM system to an IEEE 802.19.1 system architecture in accordance with various embodiments. As is to be appreciated, there are many other possible mappings between the DSM system and the 802.19.1 system architectures. For example, in FIG. 24, the CDIS could reside at a DSM server, which would pass the information, to other DSM servers.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, terminal, base station, RNC, or any host computer.

The invention claimed is:

1. A method for dynamic spectrum management comprising:

receiving whitespace spectrum data from a whitespace data repository server, the whitespace spectrum data including available frequency range data;

receiving a channel query message from a whitespace device, the channel query message including a range of spectrum for which available frequency range data is requested; and transmitting a channel availability reply message to the whitespace device in response to the channel query message, the channel availability reply message including preferred frequency range data, the preferred frequency range data determined based on at least the whitespace spectrum data and comprising data from which the whitespace device may choose a channel.

2. The method of claim 1 wherein the available frequency range data comprises a channel list and the preferred frequency range data includes a channel list.

3. The method of claim 1 further comprising:

storing supplemental spectrum usage data, wherein the supplemental spectrum usage data includes data received from whitespace devices other than the whitespace device from which the channel query message was received.

4. The method of claim 3 wherein the supplemental spectrum usage data includes spectrum measurement data.

5. The method of claim 1 wherein the preferred frequency range data is determined based at least in part on a criterion to maximize contiguous unused spectrum blocks.

6. The method of claim 1 wherein the channel query message further includes antenna characteristics of the whitespace device.

7. The method of claim 6 wherein the antenna characteristics include antenna height.

8. The method of claim 1 wherein the range of spectrum for which available frequency range data is requested comprises a list of channels.

9. The method of claim 1 wherein the channel availability reply message to the whitespace device includes channel-specific control messaging requirements.

10. The method of claim 9 wherein the channel-specific control messaging requirements include indication of the use of a heartbeat mechanism to indicate continued usage.

11. The method of claim 1 further comprising:

storing supplemental spectrum usage data, wherein the supplemental spectrum usage data comprises information regarding spectrum usage within the whitespace spectrum in addition to the whitespace spectrum usage data from the whitespace data repository server.

12. The method of claim 1 further comprising:

receiving from the whitespace device a channel acknowledgement message indicating a channel selection.

13. A dynamic spectrum management, DSM, apparatus comprising:

a transceiver: and a processor configured to:

receive whitespace spectrum data from a whitespace data repository server, the whitespace spectrum data including available frequency range data;

receive a channel query message from a whitespace device, the channel query message including a range of spectrum for which available frequency range data is requested;

identify preferred frequency range data, the preferred frequency range data determined based on at least the whitespace spectrum data and comprising data from which the whitespace device may choose a channel; and transmit a channel availability reply message in response to the channel query message, the channel availability reply message including the preferred frequency range data.

14. The apparatus of claim 13 wherein the channel query message includes antenna characteristics of the whitespace device.

15. The apparatus of claim 14 wherein the antenna characteristics include antenna height.

16. The apparatus of claim 13 further comprising:
a supplemental data storage module configured to store supplemental spectrum usage data, wherein the supplemental spectrum usage data comprises information regarding spectrum usage within the whitespace spectrum in addition to the whitespace spectrum usage data from the whitespace data repository server.

17. The apparatus of claim 13 further comprising:
a supplemental data storage module configured to store supplemental spectrum usage data, wherein the supplemental spectrum usage data includes data received from whitespace devices other than the whitespace device from which the channel query message was received.

18. The apparatus of claim 13 wherein the processor is further configured to receive from the whitespace device a channel acknowledgement message indicating a channel selection.

19. A method for dynamic spectrum management implemented in a whitespace device, the method comprising:
transmitting a channel query message, the channel query message including a range of spectrum for which available frequency range data is requested;
receiving a channel availability reply message in response to the channel query message, the channel availability reply message including preferred frequency range data, the preferred frequency range data comprising data from which the whitespace device may choose a channel; and
selecting a channel for use by the whitespace device based on the preferred frequency range data.

20. The method of claim 19 wherein the preferred frequency range data includes a channel list.

21. The method of claim 19 wherein the channel query message further includes antenna characteristics of the whitespace device.

22. The method of claim 21 wherein the antenna characteristics include antenna height.

23. The method of claim 19 wherein the range of spectrum for which available frequency range data is requested comprises a list of channels.

24. The method of claim 19 wherein the channel availability reply message includes channel-specific control messaging requirements.

25. The method of claim 24 wherein the channel-specific control messaging requirements include indication of the use of a heartbeat mechanism to indicate continued usage.

26. The method of claim 19 further comprising:
transmitting a channel acknowledgement message indicating the selected channel.

27. A whitespace device comprising:
a transceiver: and
a processor configured to:
transmit a channel query message, the channel query message including a range of spectrum for which available frequency range data is requested;
receive a channel availability reply message in response to the channel query message, the channel availability reply message including preferred frequency range data, the preferred frequency range data comprising data from which the whitespace device may choose a channel; and
select a channel for use by the whitespace device based on the preferred frequency range data.

28. The apparatus of claim 27 wherein the channel query message includes antenna characteristics of the whitespace device.

29. The apparatus of claim 28 wherein the antenna characteristics include antenna height.

30. The device of claim 27 wherein the processor is further configured to transmit a channel acknowledgement message indicating the selected channel.

* * * * *